(12) United States Patent
Felder

(10) Patent No.: US 11,127,312 B2
(45) Date of Patent: Sep. 21, 2021

(54) METHODS, SYSTEMS, APPARATUSES, AND DEVICES FOR FACILITATING DISPENSING OF MATERIAL AND PRESENTING OF CONTENT

(71) Applicant: John Felder, Oakland, CA (US)

(72) Inventor: John Felder, Oakland, CA (US)

( * ) Notice: Subject to any disclaimer, the term of this patent is extended or adjusted under 35 U.S.C. 154(b) by 0 days.

(21) Appl. No.: 17/014,598

(22) Filed: Sep. 8, 2020

(65) Prior Publication Data

US 2021/0110736 A1    Apr. 15, 2021

Related U.S. Application Data

(60) Provisional application No. 62/915,169, filed on Oct. 15, 2019.

(51) Int. Cl.
| | |
|---|---|
| *G09B 5/00* | (2006.01) |
| *G09B 19/00* | (2006.01) |
| *G08B 5/22* | (2006.01) |
| *A46B 9/04* | (2006.01) |
| *A61C 17/22* | (2006.01) |
| *A46B 13/02* | (2006.01) |
| *G09B 5/06* | (2006.01) |

(Continued)

(52) U.S. Cl.
CPC ............ *G09B 19/0084* (2013.01); *A46B 9/04* (2013.01); *A46B 13/02* (2013.01); *A46B 17/08* (2013.01); *A61C 15/043* (2013.01); *A61C 17/224* (2013.01); *G08B 5/22* (2013.01); *G09B 5/065* (2013.01)

(58) Field of Classification Search
CPC ...... G09B 19/0084; G09B 5/065; A46B 9/04; A46B 13/02; A46B 17/08; A61C 15/043; A61C 17/224; G08B 5/22; G08B 21/182; G08B 21/12; A47K 10/32; A47K 13/26; A47K 5/12; A47K 5/1202; A47K 5/1211; A47K 2010/3226; A47K 5/1205; C12Q 1/04; G08C 17/02

See application file for complete search history.

(56) References Cited

U.S. PATENT DOCUMENTS

| | | | |
|---|---|---|---|
| 7,665,600 B1 * | 2/2010 | Griffin | ................. A61C 15/043 |
| | | | 206/63.5 |
| 10,376,345 B2 * | 8/2019 | Evans | ................. A61C 15/043 |

(Continued)

*Primary Examiner* — Hai Phan
*Assistant Examiner* — Anthony D Afrifa-Kyei

(57) ABSTRACT

Disclosed herein is a smart dispenser for facilitating dispensing of material and presenting of content. Further, the smart dispenser may include a container, a dispensing mechanism, a storage device, a processing device, and a presentation device. Further, the interior space is configured for storing material. Further, the dispensing mechanism is operationally coupled with the container. Further, the dispensing mechanism is configured for dispensing a dosage of the material through the opening based on a command. Further, the storage device is configured for retrieving dosage data. Further, the processing device is communicatively coupled with the dispensing mechanism and the storage device. Further, the processing device is configured for generating the command based on the dosage data. Further, the presentation device is communicatively coupled with the processing device. Further, the presentation device is configured for presenting a content to a user based on the command.

10 Claims, 21 Drawing Sheets

(51) Int. Cl.
*A61C 15/04* (2006.01)
*A46B 17/08* (2006.01)

(56) References Cited

U.S. PATENT DOCUMENTS

| | | | | |
|---|---|---|---|---|
| 2002/0160351 | A1* | 10/2002 | Williams | G09B 19/0084 |
| | | | | 434/365 |
| 2003/0140938 | A1* | 7/2003 | Evans | A61C 15/043 |
| | | | | 132/325 |
| 2007/0190509 | A1* | 8/2007 | Kim | A46B 15/0008 |
| | | | | 434/263 |
| 2011/0133611 | A1* | 6/2011 | Clarke | A47B 81/007 |
| | | | | 312/209 |
| 2011/0189358 | A1* | 8/2011 | Herbert | A23G 9/22 |
| | | | | 426/231 |
| 2015/0297463 | A1* | 10/2015 | Barton | G01F 11/28 |
| | | | | 222/424.5 |
| 2017/0318964 | A1* | 11/2017 | McKnight | A47K 5/1202 |
| 2018/0184857 | A1* | 7/2018 | Pai | A46B 9/04 |

* cited by examiner

METHODS, SYSTEMS, APPARATUSES, AND DEVICES FOR FACILITATING DISPENSING OF MATERIAL AND PRESENTING OF CONTENT

The current application claims a priority to the U.S. Provisional Patent application Ser. No. 62/915,169 filed on Oct. 15, 2019.

FIELD OF THE INVENTION

Generally, the present disclosure relates to the field of dispensing. More specifically, the present disclosure relates to methods, systems, apparatuses, and devices for facilitating dispensing of material and presenting of content.

BACKGROUND OF THE INVENTION

In present times, dental healthcare providers are known to provide instruction on proper care and techniques, including the infrequent provision of specific materiel required for the maintenance of teeth. This instruction may be performed in conjunction with occasional visits to a professional dentist to review health and technique, provided an individual has the time, means, and inclination to visit the dentist. Further, it is known that the individual may provide for their health regularly with daily brushing, mouth-washing, flossing, etc. utilizing well-known implements and products, including electric toothbrushes and fluoride-doped mouthwashes. Further, there exists a gap between self-care and professional attention if the individual is not inclined to visit the professional dentists.

Therefore, there is a need for improved methods, systems, apparatuses, and devices for facilitating dispensing of material and presenting of content that may overcome one or more of the above-mentioned problems and/or limitations.

SUMMARY OF THE INVENTION

This summary is provided to introduce a selection of concepts in a simplified form, that are further described below in the Detailed Description. This summary is not intended to identify key features or essential features of the claimed subject matter. Nor is this summary intended to be used to limit the claimed subject matter's scope.

Disclosed herein is a smart dispenser for facilitating dispensing of material and presenting of content, in accordance with some embodiments. Accordingly, the smart dispenser may include at least one container, at least one dispensing mechanism, a storage device, a processing device, and a presentation device. Further, the at least one container may include at least one interior space and at least one opening leading into the at least one interior space. Further, the at least one interior space may be configured for storing at least one material. Further, the at least one dispensing mechanism may be operationally coupled with the at least one container. Further, the at least one dispensing mechanism may be configured for dispensing at least one dosage of the at least one material through the at least one opening based on a command. Further, the storage device may be configured for retrieving dosage data associated with the at least one dosage of the at least one material. Further, the processing device may be communicatively coupled with the at least one dispensing mechanism and the storage device. Further, the processing device may be configured for generating the command based on the dosage data. Further, the presentation device may be communicatively coupled with the processing device. Further, the presentation device may be configured for presenting a content to a user associated with the smart dispenser based on the command.

Both the foregoing summary and the following detailed description provide examples and are explanatory only. Accordingly, the foregoing summary and the following detailed description should not be considered to be restrictive. Further, features or variations may be provided in addition to those set forth herein. For example, embodiments may be directed to various feature combinations and sub-combinations described in the detailed description.

BRIEF DESCRIPTION OF DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the applicants. The applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE INVENTION

Figure 1:
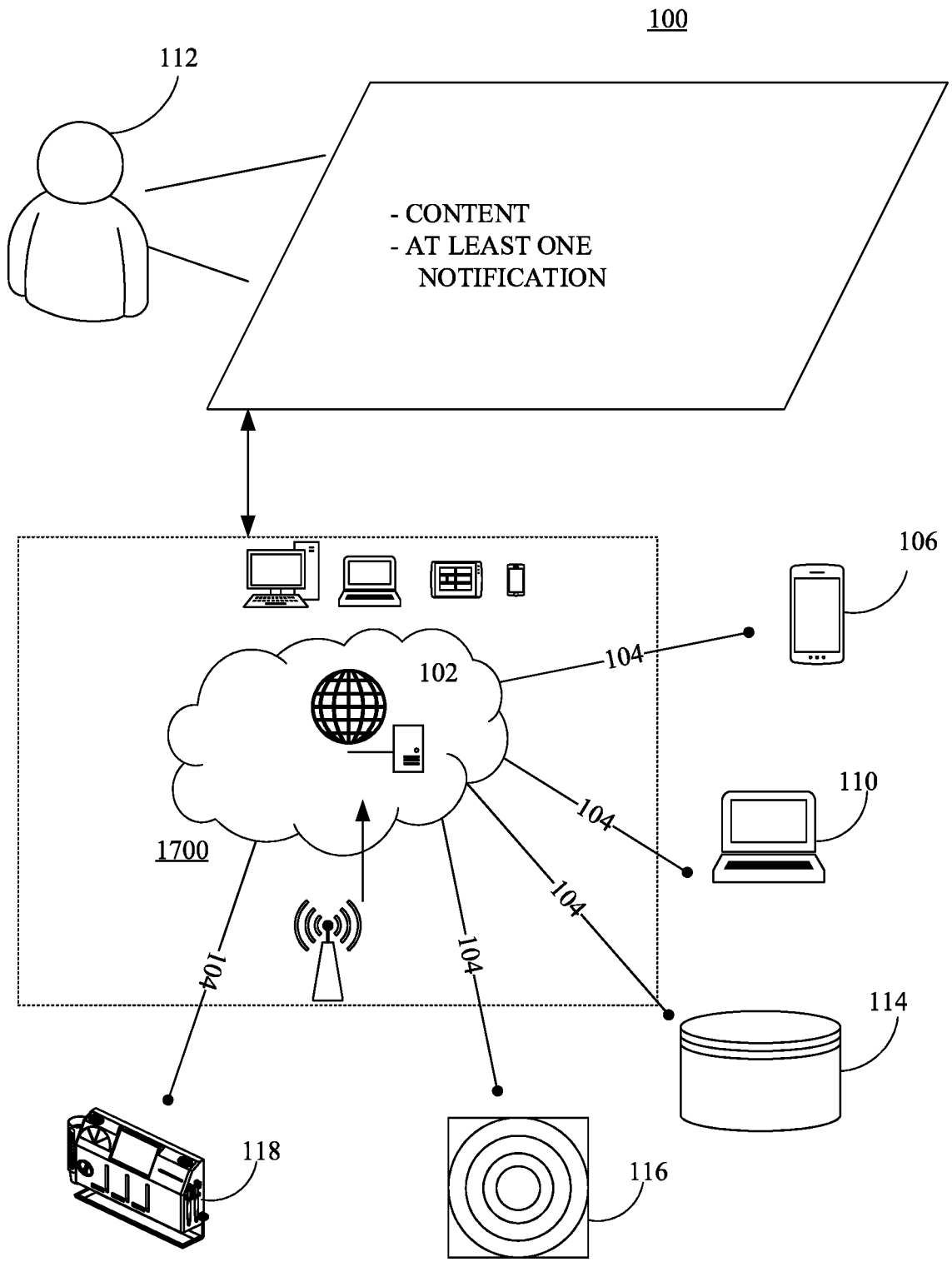
FIG. 1 is an illustration of an online platform consistent with various embodiments of the present disclosure.

As a preliminary matter, it will readily be understood by one having ordinary skill in the relevant art that the present disclosure has broad utility and application. As should be understood, any embodiment may incorporate only one or a plurality of the above-disclosed aspects of the disclosure and may further incorporate only one or a plurality of the above-disclosed features. Furthermore, any embodiment discussed and identified as being "preferred" is considered to be part of a best mode contemplated for carrying out the embodiments of the present disclosure. Other embodiments also may be discussed for additional illustrative purposes in providing a full and enabling disclosure. Moreover, many embodiments, such as adaptations, variations, modifications, and equivalent arrangements, will be implicitly disclosed by the embodiments described herein and fall within the scope of the present disclosure.

Accordingly, while embodiments are described herein in detail in relation to one or more embodiments, it is to be understood that this disclosure is illustrative and exemplary of the present disclosure, and are made merely for the purposes of providing a full and enabling disclosure. The detailed disclosure herein of one or more embodiments is not intended, nor is to be construed, to limit the scope of patent protection afforded in any claim of a patent issuing here from, which scope is to be defined by the claims and the equivalents thereof. It is not intended that the scope of patent protection be defined by reading into any claim limitation found herein and/or issuing here from that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present disclosure. Accordingly, it is intended that the scope of patent protection is to be defined by the issued claim(s) rather than the description set forth herein.

Additionally, it is important to note that each term used herein refers to that which an ordinary artisan would understand such term to mean based on the contextual use of such term herein. To the extent that the meaning of a term used herein—as understood by the ordinary artisan based on the contextual use of such term—differs in any way from any particular dictionary definition of such term, it is intended that the meaning of the term as understood by the ordinary artisan should prevail.

Furthermore, it is important to note that, as used herein, "a" and "an" each generally denotes "at least one," but does not exclude a plurality unless the contextual use dictates otherwise. When used herein to join a list of items, "or" denotes "at least one of the items," but does not exclude a plurality of items of the list. Finally, when used herein to join a list of items, "and" denotes "all of the items of the list."

The following detailed description refers to the accompanying drawings. Wherever possible, the same reference numbers are used in the drawings and the following description to refer to the same or similar elements. While many embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the claims found herein and/or issuing here from. The present disclosure contains headers. It should be understood that these headers are used as references and are not to be construed as limiting upon the subjected matter disclosed under the header.

The present disclosure includes many aspects and features. Moreover, while many aspects and features relate to, and are described in the context of methods, systems, apparatuses, and devices for facilitating dispensing of material and presenting of content, embodiments of the present disclosure are not limited to use only in this context.

In general, the method disclosed herein may be performed by one or more computing devices. For example, in some embodiments, the method may be performed by a server computer in communication with one or more client devices over a communication network such as, for example, the Internet. In some other embodiments, the method may be performed by one or more of at least one server computer, at least one client device, at least one network device, at least one sensor, and at least one actuator. Examples of the one or more client devices and/or the server computer may include, a desktop computer, a laptop computer, a tablet computer, a personal digital assistant, a portable electronic device, a wearable computer, a smartphone, an Internet of Things (IoT) device, a smart electrical appliance, a video game console, a rack server, a super-computer, a mainframe computer, mini-computer, micro-computer, a storage server, an application server (e.g. a mail server, a web server, a real-time communication server, an FTP server, a virtual server, a proxy server, a DNS server, etc.), a quantum computer, and so on. Further, one or more client devices and/or the server computer may be configured for executing a software application such as, for example, but not limited to, an operating system (e.g. Windows, Mac OS, Unix, Linux, Android, etc.) in order to provide a user interface (e.g. GUI, touch-screen based interface, voice-based interface, gesture-based interface, etc.) for use by the one or more users and/or a network interface for communicating with other devices over a communication network. Accordingly, the server computer may include a processing device configured for performing data processing tasks such as, for example, but not limited to, analyzing, identifying, determining, generating, transforming, calculating, computing, compressing, decompressing, encrypting, decrypting, scrambling, splitting, merging, interpolating, extrapolating, redacting, anonymizing, encoding and decoding. Further, the server computer may include a communication device configured for communicating with one or more external devices. The one or more external devices may include, for example, but are not limited to, a client device, a third-party database, a public database, a private database and so on. Further, the communication device may be configured for communicating with the one or more external devices over one or more communication channels. Further, the one or more communication channels may include a wireless communication channel and/or a wired communication channel. Accordingly, the communication device may be configured for performing one or more of transmitting and receiving of information in electronic form. Further, the server computer may include a storage device configured for performing data storage and/or data retrieval operations. In general, the storage device may be configured for providing reliable storage of digital information. Accordingly, in some embodiments, the storage device may be based on technologies such as, but not limited to, data compression, data backup, data redundancy, deduplication, error correction, data fingerprinting, role-based access control, and so on.

Further, one or more steps of the method disclosed herein may be initiated, maintained, controlled and/or terminated based on a control input received from one or more devices operated by one or more users such as, for example, but not limited to, an end-user, an admin, a service provider, a service consumer, an agent, a broker and a representative thereof. Further, the user as defined herein may refer to a human, an animal or an artificially intelligent being in any state of existence, unless stated otherwise, elsewhere in the present disclosure. Further, in some embodiments, the one or more users may be required to successfully perform authentication in order for the control input to be effective. In general, a user of the one or more users may perform authentication based on the possession of a secret human-readable secret data (e.g. username, password, passphrase, PIN, secret question, secret answer, etc.) and/or possession of a machine-readable secret data (e.g. encryption key, decryption key, bar codes, etc.) and/or or possession of one or more embodied characteristics unique to the user (e.g. biometric variables such as, but not limited to, fingerprint, palm-print, voice characteristics, behavioral characteristics, facial features, iris pattern, heart rate variability, evoked potentials, brain waves, and so on) and/or possession of a unique device (e.g. a device with a unique physical and/or chemical and/or biological characteristic, a hardware device with a unique serial number, a network device with a unique IP/MAC address, a telephone with a unique phone number, a smartcard with an authentication token stored thereupon, etc.). Accordingly, the one or more steps of the method may include communicating (e.g. transmitting and/or receiving) with one or more sensor devices and/or one or more actuators in order to perform authentication. For example, the one or more steps may include receiving, using the communication device, the secret human-readable data from an input device such as, for example, a keyboard, a keypad, a touch-screen, a microphone, a camera and so on. Likewise, the one or more steps may include receiving, using the communication device, the one or more embodied characteristics from one or more biometric sensors.

Further, one or more steps of the method may be automatically initiated, maintained, and/or terminated based on one or more predefined conditions. In an instance, the one or more predefined conditions may be based on one or more contextual variables. In general, the one or more contextual variables may represent a condition relevant to the performance of the one or more steps of the method. The one or more contextual variables may include, for example, but are not limited to, location, time, identity of a user associated with a device (e.g. the server computer, a client device, etc.) corresponding to the performance of the one or more steps, environmental variables (e.g. temperature, humidity, pressure, wind speed, lighting, sound, etc.) associated with a device corresponding to the performance of the one or more steps, physical state and/or physiological state and/or psychological state of the user, physical state (e.g. motion, direction of motion, orientation, speed, velocity, acceleration, trajectory, etc.) of the device corresponding to the performance of the one or more steps and/or semantic content of data associated with the one or more users. Accordingly, the one or more steps may include communicating with one or more sensors and/or one or more actuators associated with the one or more contextual variables. For example, the one or more sensors may include, but are not limited to, a timing device (e.g. a real-time clock), a location sensor (e.g. a GPS receiver, a GLONASS receiver, an indoor location sensor, etc.), a biometric sensor (e.g. a fingerprint sensor), an environmental variable sensor (e.g. temperature sensor, humidity sensor, pressure sensor, etc.) and a device state sensor (e.g. a power sensor, a voltage/current sensor, a switch-state sensor, a usage sensor, etc. associated with the device corresponding to performance of the or more steps).

Further, the one or more steps of the method may be performed one or more number of times. Additionally, the one or more steps may be performed in any order other than as exemplarily disclosed herein, unless explicitly stated otherwise, elsewhere in the present disclosure. Further, two or more steps of the one or more steps may, in some embodiments, be simultaneously performed, at least in part. Further, in some embodiments, there may be one or more time gaps between performance of any two steps of the one or more steps.

Further, in some embodiments, the one or more predefined conditions may be specified by the one or more users. Accordingly, the one or more steps may include receiving, using the communication device, the one or more predefined conditions from one or more and devices operated by the one or more users. Further, the one or more predefined conditions may be stored in the storage device. Alternatively, and/or additionally, in some embodiments, the one or more predefined conditions may be automatically determined, using the processing device, based on historical data corresponding to performance of the one or more steps. For example, the historical data may be collected, using the storage device, from a plurality of instances of performance of the method. Such historical data may include performance actions (e.g. initiating, maintaining, interrupting, terminating, etc.) of the one or more steps and/or the one or more contextual variables associated therewith. Further, machine learning may be performed on the historical data in order to determine the one or more predefined conditions. For instance, machine learning on the historical data may determine a correlation between one or more contextual variables and performance of the one or more steps of the method. Accordingly, the one or more predefined conditions may be generated, using the processing device, based on the correlation.

Further, one or more steps of the method may be performed at one or more spatial locations. For instance, the method may be performed by a plurality of devices interconnected through a communication network. Accordingly, in an example, one or more steps of the method may be performed by a server computer. Similarly, one or more steps of the method may be performed by a client computer. Likewise, one or more steps of the method may be performed by an intermediate entity such as, for example, a proxy server. For instance, one or more steps of the method may be performed in a distributed fashion across the plurality of devices in order to meet one or more objectives. For example, one objective may be to provide load balancing between two or more devices. Another objective may be to restrict a location of one or more of an input data, an output data, and any intermediate data therebetween corresponding to one or more steps of the method. For example, in a client-server environment, sensitive data corresponding to a user may not be allowed to be transmitted to the server computer. Accordingly, one or more steps of the method operating on the sensitive data and/or a derivative thereof may be performed at the client device.

Overview:

The present disclosure describes a smart dispenser. The smart dispenser offers an integrated apparatus featuring controlled material provision linked with an interactive system offering guidance on the correct use and application of said material. Specifically, the smart dispenser provides metered doses and allotments of common dental implements and compounds while supporting a user via the autonomous presentation of animated instructional content related to the most effective techniques and practices as may be provided by the American Dental Association or other professional bodies. Additional applications may be found in the fields of product advertisement and sale, wherein the contents of the smart dispenser may be interchanged with commercial goods and the educational programs replaced with advertising content.

The smart dispenser comprises an enclosure, a plurality of fluid dispensers, a floss dispenser, a cup dispenser, a recharging station, a media playback system, an educational package, and a control suite. The enclosure defines the rigid structural body supporting or containing all subcomponents of the proposed assembly, including means for attaching the smart dispenser to external structures (walls, shelving, doors, etc.). Within the enclosure, the plurality of fluid dispensers and the floss dispenser are arrayed laterally across the longest axis of the enclosure such that a user may access each entity defined therein individually or in conjunction. The specific functions of the plurality of dispensers are defined according to a given application, generally contemplated to provide a means of measures dispensation of materiel based on a programmed volume-per-activation or daily value regimen as may be configured by the user or operator. Specific contemplation is given to the introduction of measurements based on pre-marked cups approximately two inches in depth with a standardized diameter. The floss dispenser further defines an automatic release and severance mechanism that dispenses a measured length of dental floss from an internal repository based on best practices outlined by the American Dental Association or other professional bodies. Specifically, the floss dispenser is contemplated to determine the length of floss drawn out of the enclosure and automatically sever the thread when the length equals approximately twenty-four inches. The cup dispenser is ideally fixed to a lateral edge of the enclosure but may be integrated as an internal component in various embodiments. The cup dispenser retains a plurality of the pre-measured cups referenced above, suitable for dispensation in conjunction with any material contained within the plurality of fluid dispensers. The recharging station defines an internal repository and converter for electrical energy combined with an externally protruding means for interfacing with an electric toothbrush. Further, the recharging station may include an internal battery pack or may be connected to a larger grid to provide power in a variety of installations. The media playback system constitutes a means of replaying the educational package via both visual and audible cues, wherein said educational package comprises a series of instructional videos, animation, or diagrams guiding the user in the practice of proper dental hygiene practices. The accompanying audible instructions, in addition to any on-screen text, that is localized to suit deployment to any location or country. This localization may include, for example, voice-overs in various languages, translation of any text, and interchange of icons and imagery as appropriate. It is further contemplated that the educational package may define alternate content suitable for a variety of installations, including advertisements for commercial venues, instructional procedures for dispensation of medical supplies, or other use-cases without limitation. The control suite defines the full range of human-machine interfaces provided in various embodiments of the application. Further, the touch-screen may be used in wet or extremely humid environments without compromising the manifold integrity of a structure. However, simplified instances of conventional switches, buttons, and/or triggers may be utilized in conjunction with or to substitute various functions of the touch-screen interface.

The enclosure comprises a casing, a plurality of wall mounts, an internal concavity, a plurality of portals, and a plurality of external retainers. The casing comprises a rigid, waterproof material formed to the specifications required to contain the functional components. The plurality of wall mounts comprises a series of suction cups arrayed across the rear face of the casing, such that the smart dispenser may be fixed to any suitable surface. A further consideration is given to the use of mechanical fasteners such as hooks or fixed pins for similar purposes in alternate embodiments. The concavity defines the substantially hollow interior volume of the enclosure, ideally accessible via a controlled access lock or similar fixture such that the expendable materials dispenser or utilized by the smart dispenser may be replenished as required. The plurality of portals defines any breaches or interruptions in the surface of the enclosure to permit the protrusion of any elements of the dispensing components described herein, including a capacity to seal any instance within the plurality of portals as required by a user or operator. The plurality of external retainers further offers the capacity to support conventional toothbrushes, or other accouterments topically found in relation to dental or personal hygiene. Specific consideration is given to the provision of a tray extending beneath the plurality of fluid dispensers, suitable for supporting a cup while the cup is being filled.

The plurality of fluid dispensers individually comprises a reservoir, an actuator, at least one volume sensor, a nozzle, and a valve. The reservoir ideally comprises a manifold container suitable for the retention of any known fluid used in association with dental health, personal hygiene, pharmaceuticals, food service, or any other compound that may be reasonably dispensed by the smart dispenser as described. A further consideration is given to the use of biodegradable or recyclable materials in the construction of any disposable elements of the smart dispenser generally, and the reservoirs specifically. The actuator defines the operable means of forcing the contents of the reservoir through the valve or providing the necessary pressure differential to affect such dispensation. In various embodiments, the actuator may define a constricting band, a linear piston, or an air compressor operably linked to the reservoir to provide motive force to the fluids contained therein. At least one volume sensor is integrated into the reservoir and valve such that the volume of dispensed fluid may be monitored and regulated based on preset values configured by a user or operator. Specifically, the volume sensor may determine the remaining volume of fluid in each reservoir in order to determine the fluid dispensed, to generate a user notification when the reservoir is depleted, or any other functionality that may be realized by a reasonably skilled individual. The nozzle defines a hollow tapered structure protruding from the enclosure opposite the tray. The nozzle is ideally in fluid communication with the reservoir through the valve, wherein the valve may be operated on command from the control suite and guided by the metrics provided by the volumetric sensor.

The floss dispenser comprises a spool, at least one linear sensor, a cutting block, and a primary cutter. The spool provides a storage media for the floss, wherein the floss may be drawn from the spool across the linear sensor. The linear sensor defines any means of ascertaining the length of floss extracted from the spool, including measurements of the rotation of the spool, or any interstitial rollers of known radii, wherein the length of floss may be calculated. The cutting block defines a semi-deformable sheave about which the terminal end of the floss is drawn, ideally exposing the apex of the curve of a segment of floss to the primary cutter. The primary cutter defines an autonomous means of severing the floss, based on metrics gathered from the linear sensor and preset configurations established in accordance with professional guidance and recommendations.

The cup dispenser defines a column, a ledge, and an observation window in at least one contemplated embodiment. The column defines a partitioned tubular structure containing a stack of cups of suitable dimensions to suit the proposed functions of the present disclosure. The ledge defines a terminal obstruction to the column, such that a user must forcefully extract the last cup in a series of similar cups to receive a cup. This prevents the entire stack of cups from being expelled from the column, by means understood by any reasonably skilled individual. The observation window permits a user to visually confirm the presence of cups within the column, permitting the redress of jams or the replenishment of the cups as required.

The recharging station comprises a platform, a connector, a distributor, and at least one power supply. The platform protrudes laterally from the enclosure such that a user may position an electric toothbrush atop the platform, fixed to the connector. The connector ideally defines a capacitive charging structure, suitable for use with conventional wireless charging toothbrushes. The connector is electrically connected to the distributor, wherein the distributor is further connected to at least one power supply. The distributor converts any input electrical energy into useable qualities suitable for delivery via the connector. At least one power supply may, in various embodiments, comprise a battery pack, a grid connection, or both depending on the use-case and needs of the operator.

The media playback system and the educational package define a means of delivering content suited to a use-case or application, and the content employed therein. Specifically, the media playback system comprises at least one display and a plurality of speakers, such that educational or instructional videos related to, for example, dental health may be relayed in conjunction with the dispensation of topic-appropriate supplies and materiel as described above. The educational package may be exchanged via the interchange of physical media or a wireless connection established via a plurality of transceivers. Among these, Bluetooth, Wi-Fi, and other known forms of near-field and long-range communications are contemplated.

The control suite comprises an input device and at least one interpretive engine. The input device is ideally defined in conjunction with the display, constituting a multi-touch, high-fidelity touch screen. Specific embodiments may include a capacitive 4k high-definition screen, an eBeam-integrated system, or any combination thereof to provide a waterproof means of establishing operable control over the smart dispenser. The interpretive engine defines an associated processor capable of detecting and converting any touch-data into operable commands within a conventional graphic user interface. Specific consideration is given to the provision of a 10-point simultaneous-touch system.

Further, the smart dispenser a dispenser of material e.g. toothpaste, mouthwash, dental floss, etc. that is enabled by sensors that lay atop plastic bags that forces the liquid material inside the bag to dispense a predetermined amount of toothpaste onto a toothbrush that is placed under the bags, hose like nozzle, this also happens with the mouthwash as well. Further, a 2 inch in depth cup is placed under the mouthwash bag inside of the dispenser and sensors. Further, the mouthwash bag dispenses a predetermined amount of mouthwash into the awaiting cup vie the calculated sensors for the 2 inch in depth cup. Further, the extraction of the dental floss is dispensed based on a predetermined amount guided by the user's hand as needed and the floss string is cut with a dispenser's cutting source vie enabled sensors that is safe for consumers as small as children. Further, the dispensing bags are housed in a biodegradable eco-friendly fiberglass hard plastic. Further, the smart dispenser may include a touch screen enabled interface sensor based algorithms that open a portal that disseminate information on how to obtain proper dental hygiene thru its program that is based on animation. Further, the software is written in several languages for the entire market. Further, the smart dispenser may include a built-in enabled Bluetooth 10 point multi-touch 4k ultra HD Resolution, embedded eBeam interactive software. Further, the touch screen may include an anti-glare tempered glass with an aluminum frame. Further, the toothpaste/gel, the mouthwash, and other liquids are housed in platinum food-grade non-toxic silicone bags as to adhere to the governing of the magnetic micro actuating sensors to dispense the actual amounts of the stated liquids of toothpaste, mouthwash, and the dental floss. The dental floss is housed on a spool build into the indentation of the dispenser's recess and distributed by (hall magnetic effect sensors) to allot the 18 inches recommended by the American Dental Association.

Further, the present disclosure offers an integrated apparatus featuring controlled material provision linked with an interactive system offering guidance on the correct use and application of said material. Specifically, the smart dispenser provides metered doses and allotments of common dental implements and compounds while supporting a user via the autonomous presentation of animated instructional content related to the most effective techniques and practices as may be provided by the American Dental Association or other professional bodies. Additional applications may be found in the fields of product advertisement and sale, wherein the contents of the present disclosure may be interchanged with commercial goods and the educational programs replaced with advertising content.

Further, the present disclosure relates generally to the field of personal hygiene, including means and methods for maintenance thereof. Specifically, the present disclosure describes an automated, network-enabled dispenser configurable for application in the dental health, hospitality, medical, or other industries wherein the controlled allocation of materiel may be desirable.

Further, the smart dispenser may provide convenient interaction with a dentist. Further, the smart dispenser may easily educate on proper dental hygiene. Further, the smart dispenser may use animated characters speaking multiple languages for a diverse audience. Further, the smart dispenser may be made up of food-grade silicone materials. Further, the smart dispenser may be made from ready to recycle material.

Further, the smart dispenser may be made up of antimicrobial silicone rubber. Further, the antimicrobial silicone rubber prevents the spread of harmful bacteria. Further, the antimicrobial silicone rubber may include neutraSil™. Further, the neutraSil™ may include an antimicrobial. Further, the antimicrobial is an agent, such as a medicine, cleaning product, or material that kills microorganisms or stops the growth of the microorganisms. Further, the neutraSil™ actively combat and reduce the growth of bacteria. Further, the neutraSil™ actively prevents the growth of common bacterial strains such as *E. coli*, MRSA, and *Salmonella*. Silver Ions present in the neutraSil™ absorb bacteria and microbes to disrupt the functioning of bacteria on its surface. This silver-ion technology disables the proton pumps of bacterial cells and disrupts sulfhydryl proteins. Bacteria that comes into contact with the neutraSil™ may not develop and grow due to this process of cell wall breakdown. The silver ions continue to guard against bacterial growth by preventing further contamination and colonization on the neutraSil™ surface. Further, the neutraSil™ is incredibly versatile. Most recently, the neutraSil™ has been used in the efforts to combat the Covid-19 virus providing applications for critical PPE equipment including head straps and comfort strips for face protection shields, hospital door handles and surgical tray liners for the medical and healthcare sectors, where hygiene and sterility are so vital. Further, the neutraSil™ is also FDA-approved, making the neutraSil™ ideal for use within the food and beverage and dairy industries.

FIG. 1 is an illustration of an online platform 100 consistent with various embodiments of the present disclosure. By way of non-limiting example, the online platform 100 to facilitate dispensing of material and presenting of content may be hosted on a centralized server 102, such as, for example, a cloud computing service. The centralized server 102 may communicate with other network entities, such as, for example, a mobile device 106 (such as a smartphone, a laptop, a tablet computer, etc.), other electronic devices 110 (such as desktop computers, server computers, etc.), databases 114, sensors 116, a smart dispenser (such as a smart dispenser 200, a smart dispenser 1000, a smart dispenser 1200, and a smart dispenser 1600) over a communication network 104, such as, but not limited to, the Internet.

Further, users of the online platform 100 may include relevant parties such as, but not limited to, end-users, administrators, and so on. Accordingly, in some instances, electronic devices operated by the one or more relevant parties may be in communication with the platform.

A user 112, such as the one or more relevant parties, may access online platform 100 through a web-based software application or browser. The web-based software application may be embodied as, for example, but not be limited to, a website, a web application, a desktop application, and a mobile application compatible with a computing device 1700.

Figure 2:
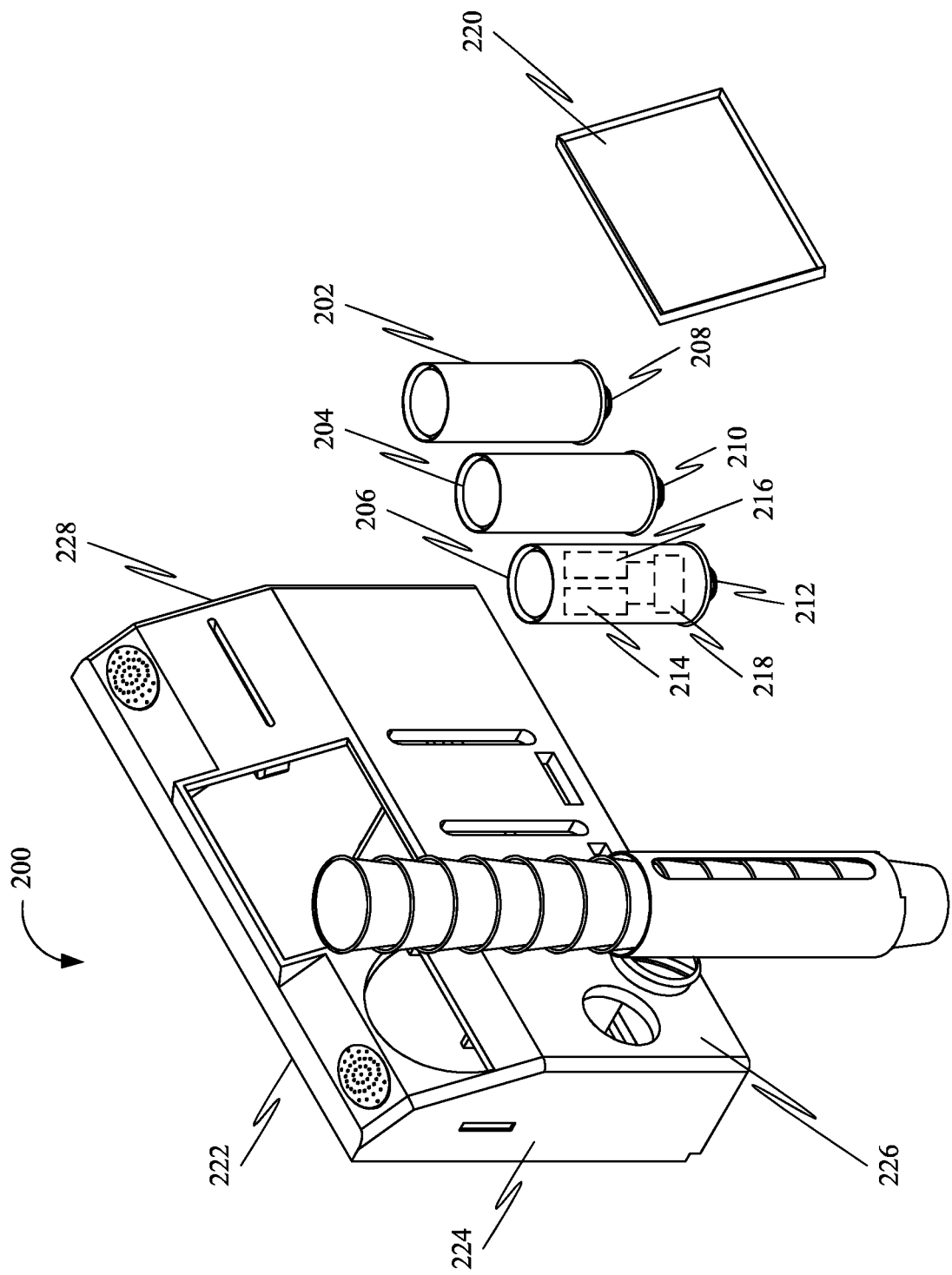
FIG. 2 is a disassembled view of a smart dispenser for facilitating dispensing of material and presenting of content, in accordance with some embodiments.

FIG. 2 is a disassembled view of a smart dispenser 200 for facilitating dispensing of material and presenting of content, in accordance with some embodiments. Further, the smart dispenser 200 may include at least one container 202-206, at least one dispensing mechanism 214, a storage device 216, a processing device 218, and a presentation device 220.

Further, the at least one container 202-206 may include at least one interior space and at least one opening 208-212 leading into the at least one interior space. Further, the at least one interior space may be configured for storing at least one material. Further, the at least one material may include at least one dental implement, at least one compound, at least one medical supply, at least one dental product, etc. Further, the at least one material may include a toothpaste, a mouth wash, a facewash, etc.

Further, the at least one dispensing mechanism 214 operationally coupled with the at least one container 202-206. Further, the at least one dispensing mechanism 214 may be configured for dispensing at least one dosage of the at least one material through the at least one opening 208-212 based on a command. Further, the at least one dispensing mechanism may include a constricting band, a linear piston, an air compressor, etc. Further, the at least one dosage may be associated with at least one of a dosage volume, a dosage mass, a dosage weight, a dosage number, a dosage length, etc.

Further, the storage device 216 may be configured for retrieving dosage data associated with the at least one dosage of the at least one material. Further, the dosage data may be associated with at least one of a technique and a practice associated with an application of the at least one material. Further, the application may include brushing, mouth-washing, flossing, etc. Further, the at least one of the technique and the practice may be provided by at least one professional body. Further, the at least one professional body may include an American Dental Association, etc.

Further, the processing device 218 may be communicatively coupled with the at least one dispensing mechanism 214 and the storage device 216. Further, the processing device 218 may be configured for generating the command based on the dosage data.

Further, the presentation device 220 (such as the mobile device 106 and the electronic devices 110) may be communicatively coupled with the processing device 218. Further, the presentation device 220 may be configured for presenting a content to a user (such as the user 112) associated with the smart dispenser 200 based on the command. Further, the content may include educational content, advertising content, etc. Further, the user may be any individual interacting with the smart dispenser 200. Further, the content may include at least one of a visual content, an aural content, and a haptic content. Further, the visual content may include a picture, a text, etc. Further, the aural content may include a sound sample, a speech sample, etc. Further, the presentation device 220 may include a smartphone, a tablet, a display device, a speaker, a projector, etc.

In further embodiments, at least one sensor (such as the sensors 116) may be coupled with the at least one container 202-206. Further, the at least one sensor may be configured for generating sensor data based on a physical quantity of the at least one material disposed in the at least one interior space. Further, the physical quantity may include mass, weight, volume, length, number, etc. Further, the processing device 218 may be communicatively coupled with the at least one sensor. Further, the processing device 218 may be configured for analyzing the sensor data. Further, the processing device 218 may be configured for generating at least one notification based on the analyzing. Further, the presentation device 220 may be configured for presenting the at least one notification to the user.

Further, in some embodiments, the content may include an educational package associated with an application of the at least one dosage of the at least one material. Further, the application may include brushing, mouth-washing, flossing, etc. Further, the education package may include a series of at least one of instructional videos, instructional animations, and instructional diagrams for facilitating the application of the at least one dosage of the at least one material. Further, the at least one of the instructional videos, the instructional animations, and the instructional diagrams may be associated with at least one object. Further, the at least one object may include at least one character. Further, the presenting of the educational package to the user may be based on the command. Further, in an embodiment, the presentation device 220 may include a media playback system. Further, the media playback system may include at least one display device and a plurality of speakers. Further, the media playback system may be configured for playing the educational package using at least one of a plurality of visual cues and a plurality of aural cues.

Figure 3:
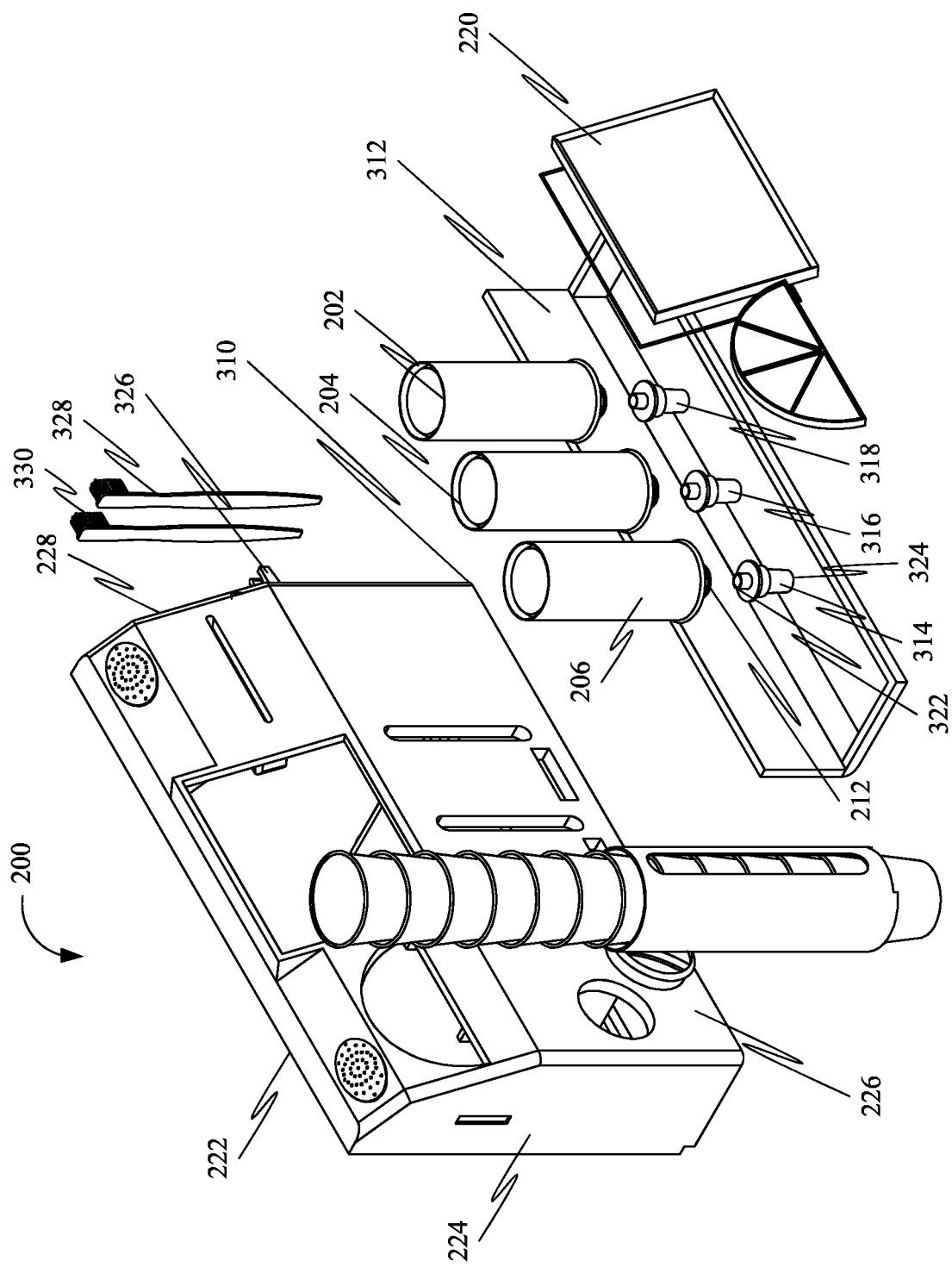
FIG. 3 is a disassembled view of the smart dispenser for facilitating the dispensing of the material and the presenting of the content, in accordance with some embodiments.

In further embodiments, at least one nozzle 314-318, as shown in FIG. 3, may be fluidly coupled with the at least one container 202-206 using at least one valve. Further, the at least one nozzle 314-318 may include a hollow tapered structure. Further, a first end 322, as shown in FIG. 3, of the at least one nozzle 314-318 may be coupled with the at least one opening 208-212. Further, the at least one material may include at least one fluid. Further, the at least one container 202-206 may be configured storing the at least one fluid. Further, the at least one dispensing mechanism 214 may be configured for dispensing the at least one dosage of the at least one fluid through a second end 324, as shown in FIG. 3, of the at least one nozzle 314-318 using the at least one valve based on the command.

Further, in some embodiment, the at least one container 202-206 may include at least one spool. Further, the at least one material may include a dental floss. Further, the at least one spool may be configured for storing the dental floss. Further, the dental floss may be wrapped around the at least one spool. Further, the at least one dispensing mechanism 214 may be configured for dispensing the at least one dosage of the dental floss based on the command.

In further embodiments, at least one first sensor (such as the sensors 116) may be coupled with the at least one spool. Further, the dental floss may be drawable from the at least one spool based on an application of an external force on an end of the dental floss. Further, the at least one first sensor may be configured for generating first sensor data based on a physical quantity of the dental floss. Further, the physical quantity may include a length of the dental floss. Further, the processing device 218 may be communicatively coupled with the at least one first sensor. Further, the processing device 218 may be configured for analyzing the first sensor data based on the dosage data. Further, the generating of the command may be based on the analyzing. Further, the at least one dispensing mechanism 214 may include at least one cutter. Further, the at least one dosage may include at least one segment of the dental floss. Further, the at least one cutter may be configured for severing the at least one segment based on the command. Further, the severing facilitates dispensing of the at least one segment of the dental floss.

Further, in some embodiment, the at least one container 202-206 may include a partitioned tubular structure. Further, the at least one material may include at least one cup. Further, the partitioned tubular structure may be configured for storing at least one cup. Further, the at least one cup may be associated with at least one dimension. Further, the at least one dimension may include a length, a breadth, a height, a circumference, etc. Further, the at least one dimension corresponds to at least one volume of the at least one cup. Further, the at least one dosage may include the at least one cup of the at least one dimension. Further, at least one portion of the at least one cup protrudes from a first end of the partitioned tubular structure. Further, the at least one dispensing mechanism 214 may include a terminal obstruction. Further, the terminal obstruction may be configured for dispensing the at least one cup based on an application of an external force on the at least one portion of the at least one cup.

Figure 5:
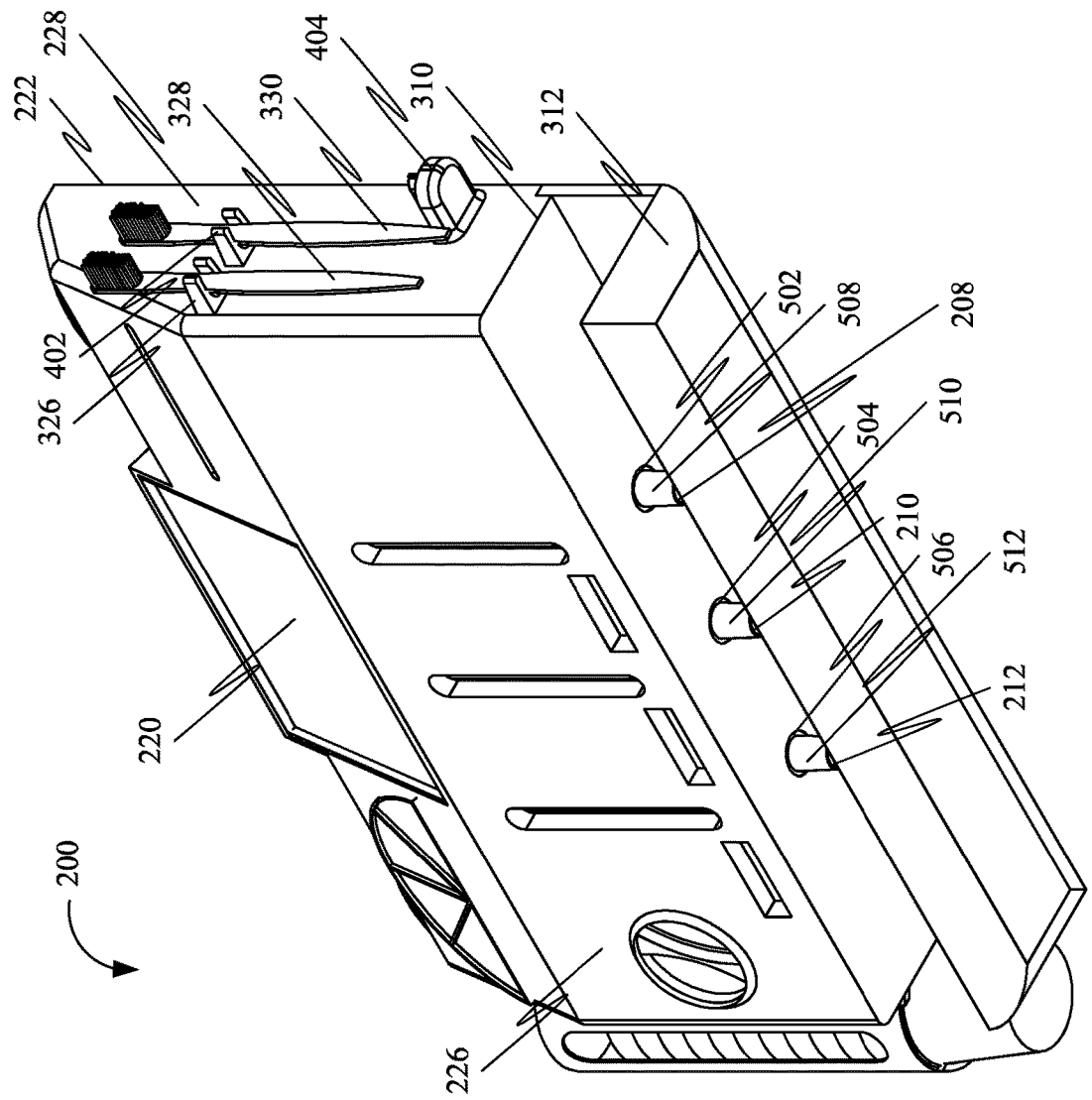
FIG. 5 is a perspective view of the smart dispenser for facilitating the dispensing of the material and the presenting of the content, in accordance with some embodiments.

In further embodiments, an enclosure 222 may be coupled with the at least one container 202-206. Further, the enclosure 222 may include at least one enclosure wall 224-228 forming an enclosure interior space. Further, the at least one container 202-206 may be disposed in the enclosure interior space. Further, the at least one enclosure wall 224-228 may include at least one enclosure opening 502-506, as shown in FIG. 5, disposed on the at least one enclosure wall 224-228 leading into the enclosure interior space. Further, at least one part 508-512, as shown in FIG. 5, of the at least one container 202-206 protrudes from the at least one enclosure opening 502-506. Further, the at least one part 508-512 may include the at least one opening 208-212 for facilitating the dispensing.

Figure 7:
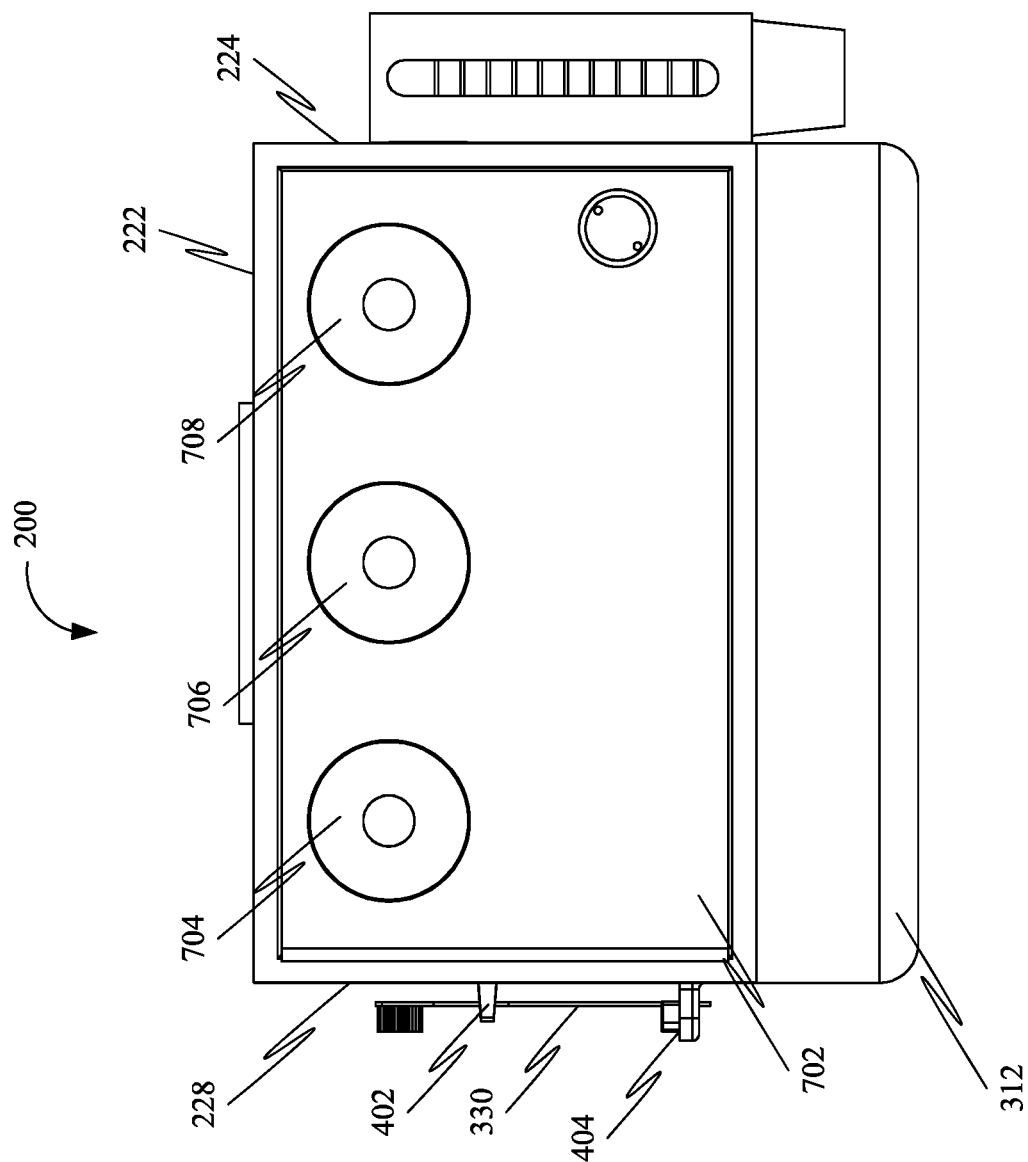
FIG. 7 is a rear view of the smart dispenser for facilitating the dispensing of the material and the presenting of the content, in accordance with some embodiments.

In further embodiments, at least one wall mount 704-708, as shown in FIG. 7, may be disposed on a rear enclosure wall 702, as shown in FIG. 7, of the at least one enclosure wall 224-228. Further, the at least one wall mount 704-708 may be configured for detachably attaching the smart dispenser 200 to at least one surface of at least one structure. Further, the at least one wall mount may include at least one suction cup, at least one hook, at least one fastener, etc. Further, the at least one structure may include a wall, a post, etc.

Figure 4:
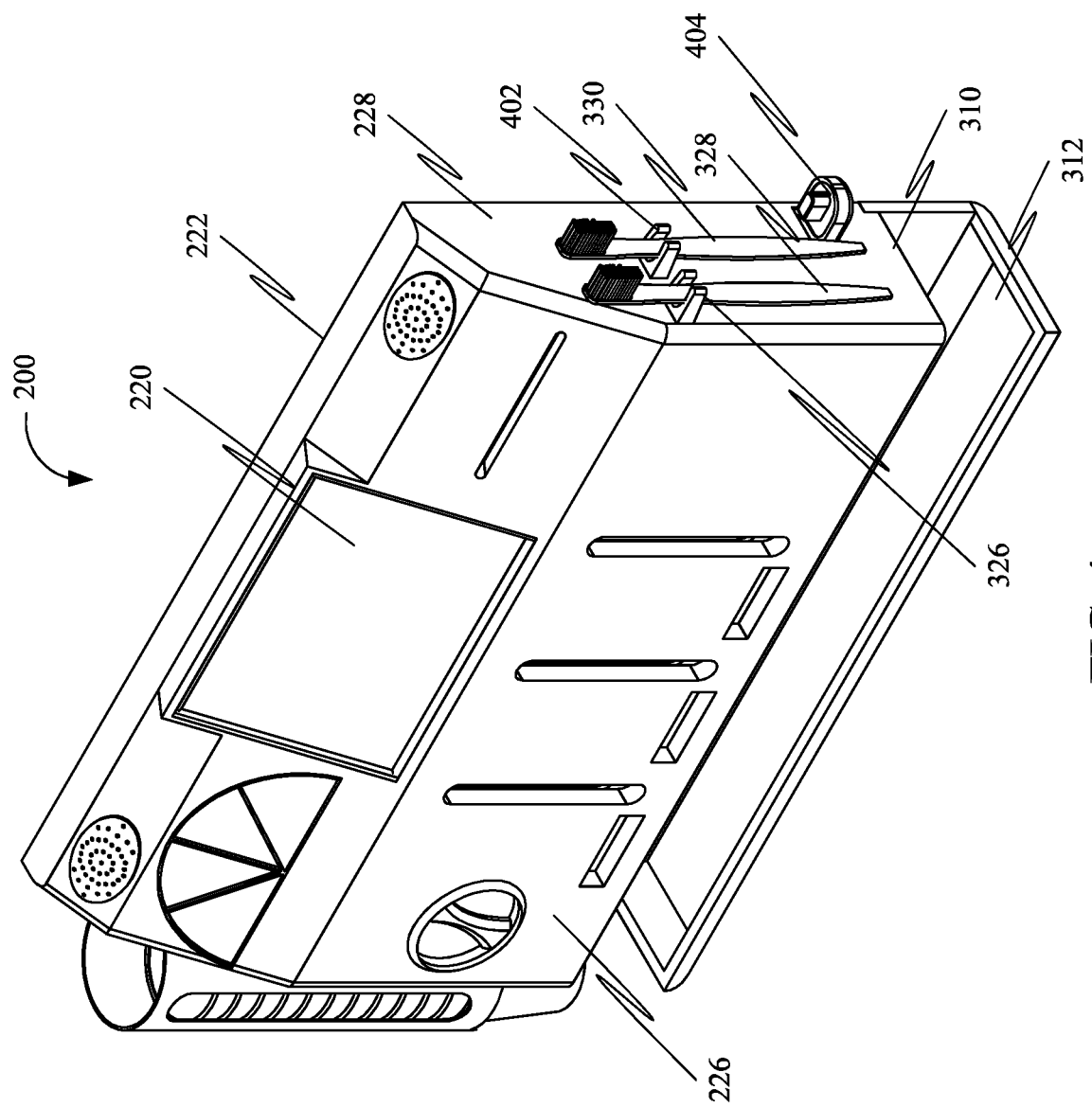
FIG. 4 is a perspective view of the smart dispenser for facilitating the dispensing of the material and the presenting of the content, in accordance with some embodiments.

In further embodiments, at least one external retainer (326 and 402), as shown in FIG. 3 and FIG. 4, may be disposed on the at least one enclosure wall 224-228. Further, the at least one external retainer (326 and 402) may be configured for supporting at least one accouterment 328-330, as shown in FIG. 3. Further, the at least one accouterment 328-330 facilitates an application of the at least one dosage of the at least one material. Further, the application may include brushing, mouth-washing, flossing, etc. Further, the at least one accouterment 328-330 may include at least one dental implement. Further, the at least one accouterment 328-330 may include at least one toothbrush.

In further embodiments, a recharging station 404, as shown in FIG. 4, may be configured for supplying electrical power to at least one toothbrush associated with the smart dispenser 200. Further, the at least one toothbrush facilitates an application of the at least one dosage of the at least one material. Further, the application may include brushing. Further, the recharging station 404 may include a platform, a connector, a distributor, and at least one power source. Further, the at least one power source may include at least one battery, at least one power supply, etc. Further, the platform protrudes laterally from the at least one enclosure wall 224-228. Further, the platform may be configured for receiving the at least one toothbrush. Further, the at least one toothbrush may be electrically coupled with the distributor using the connector. Further, the distributor may be configured for receiving the electrical power from the at least one power source. Further, the electrical power may be associated with at least one of a quantity and a quality. Further, the quantity may include a voltage level, a current level, a power level, etc. Further, the quality may include a frequency, a waveform, etc. Further, the distributor may be configured for transforming the electrical power from at least one of a first quantity and a first quality to at least one of a second quantity and a second quality. Further, the distributor may be configured for supplying the electrical power of the at least one of the second quantity and the second quality to the at least one toothbrush through the connector.

In further embodiments, at least one input device (such as the mobile device 106 and the electronic devices 110) may be disposed on the at least one enclosure wall 224-228. Further, the at least one input device may include a touch screen. Further, the touch screen may be a multi touch screen and a high fidelity touch screen. Further, the at least one input device may be configured for receiving at least one input from the user associated with the smart dispenser 200. Further, the at least one input may include at least one touch on the touch screen. Further, the at least one input device may be configured for generating input data based on the receiving. Further, the processing device 218 may be communicatively coupled with the at least one input device. Further, the processing device 218 may be configured for analyzing the input data. Further, the processing device 218 may be configured for generating the dosage data based on the analyzing of the input data. Further, the storage device 216 may be configured for storing the dosage data based on the generating. Further, the at least one input device may include a computing device such as a smartphone, a laptop, a desktop, a tablet, a smartwatch, etc.

Further, in some embodiments, the touch screen may be integrated with the at least one display device. Further, the at least one display device may be configured for receiving the at least one touch on the at least one display device. Further, the at least one display device may be configured for generating the input data based on the at least one touch. Further, the processing device 218 may be configured for generating the command based on the analyzing of the input data. Further, the presentation device 220 may be configured for presenting the content based on the command.

In further embodiments, at least one tray 312, as shown in FIG. 3, may be coupled with the enclosure 222. Further, the at least one tray 312 may be detachably attached to a base end 310, as shown in FIG. 3, of the enclosure 222. Further, the at least one tray 312 extends laterally in relation to the at least one enclosure wall 224-228. Further, the at least one tray 312 may be configured for holding at least one first container juxtaposed the at least one enclosure opening 502-506. Further, the holding of the at least one first container facilitates receiving of the at least one material in the at least one first container based on the dispensing.

In further embodiments, a communication device (not shown) may be communicatively coupled with the presentation device 220. Further, the communication device may be configured for receiving the content from at least one external device (such as the mobile device 106 and the electronic device 110) over at least one of a wired connection and a wireless connection. Further, the wireless connection may include a Bluetooth, a Wi-Fi, an Infrared, a near field communication, a ZigBee, etc. Further, the presenting of the content may be based on the receiving of the content.

Further, in some embodiments, the storage device 216 may be communicatively coupled with the presentation device 220. Further, the storage device 216 may be configured for storing the content.

Further, in some embodiments, the at least one container 202-206 may include at least one first material. Further, the at least one first material may include at least one of biodegradable material and recyclable material.

FIG. 3 is a disassembled view of the smart dispenser 200 for facilitating the dispensing of the material and the presenting of the content, in accordance with some embodiments.

FIG. 4 is a perspective view of the smart dispenser 200 for facilitating the dispensing of the material and the presenting of the content, in accordance with some embodiments. Further, the FIG. 4 is an assembled view of the smart dispenser 200.

FIG. 5 is a perspective view of the smart dispenser 200 for facilitating the dispensing of the material and the presenting of the content, in accordance with some embodiments.

Figure 6:
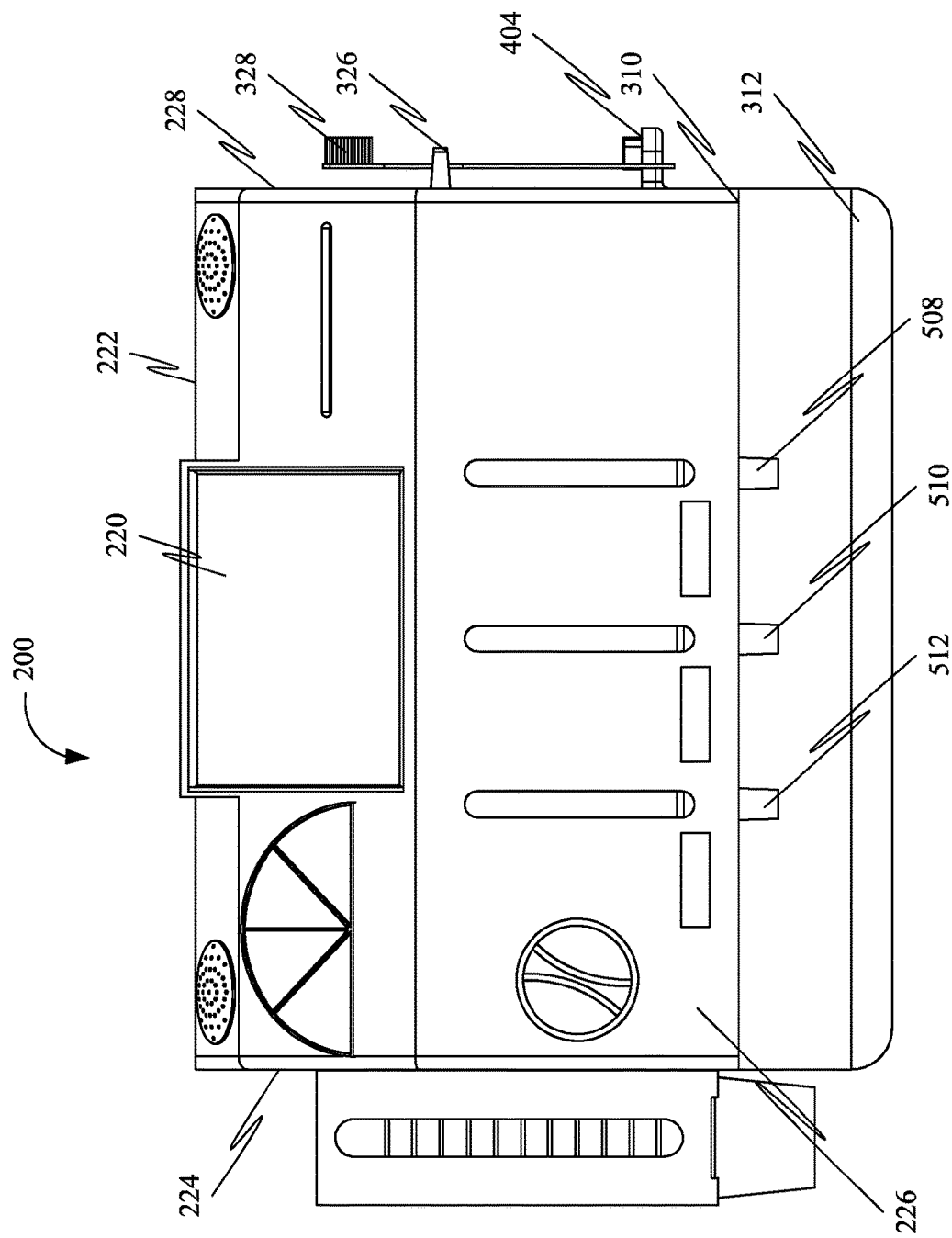
FIG. 6 is a front view of the smart dispenser for facilitating the dispensing of the material and the presenting of the content, in accordance with some embodiments.

FIG. 6 is a front view of the smart dispenser 200 for facilitating the dispensing of the material and the presenting of the content, in accordance with some embodiments.

FIG. 7 is a rear view of the smart dispenser 200 for facilitating the dispensing of the material and the presenting of the content, in accordance with some embodiments.

Figure 8:
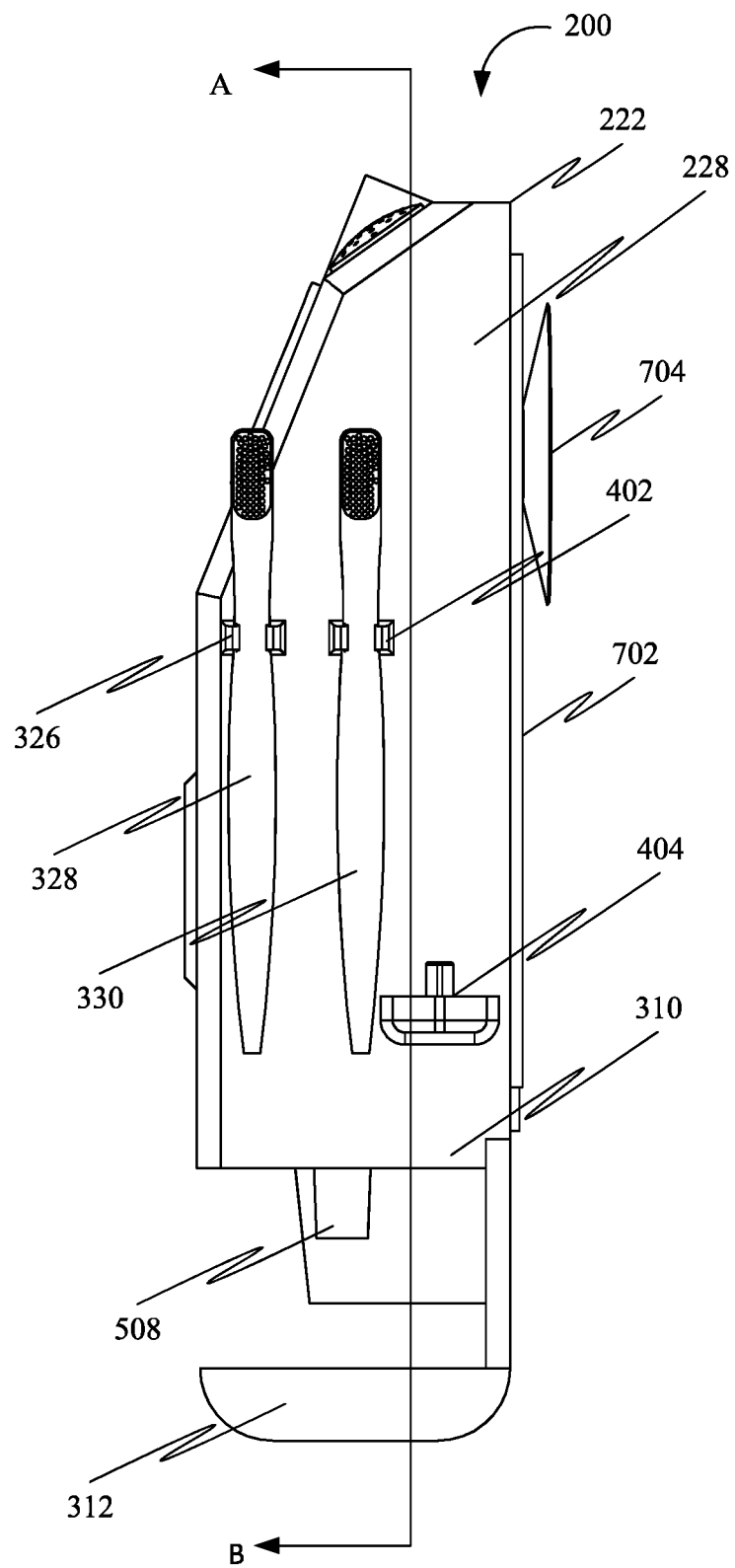
FIG. 8 is a side view of the smart dispenser for facilitating the dispensing of the material and the presenting of the content, in accordance with some embodiments.

FIG. 8 is a side view of the smart dispenser 200 for facilitating the dispensing of the material and the presenting of the content, in accordance with some embodiments.

Figure 9:
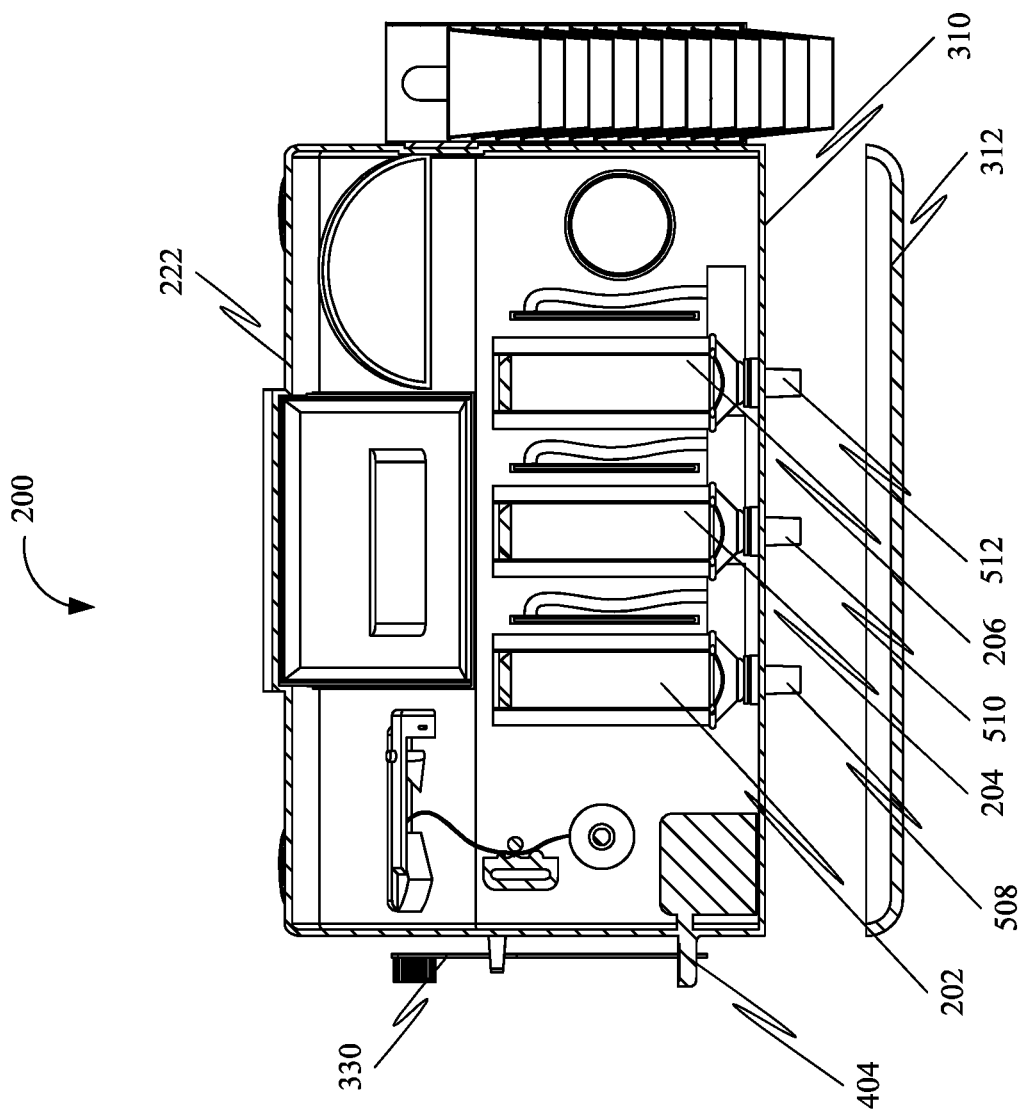
FIG. 9 is a cross-sectional view of the smart dispenser along line A-B as shown in the FIG. 8, in accordance with some embodiments.

FIG. 9 is a cross-sectional view of the smart dispenser 200 along line A-B as shown in the FIG. 8, in accordance with some embodiments.

Figure 10:
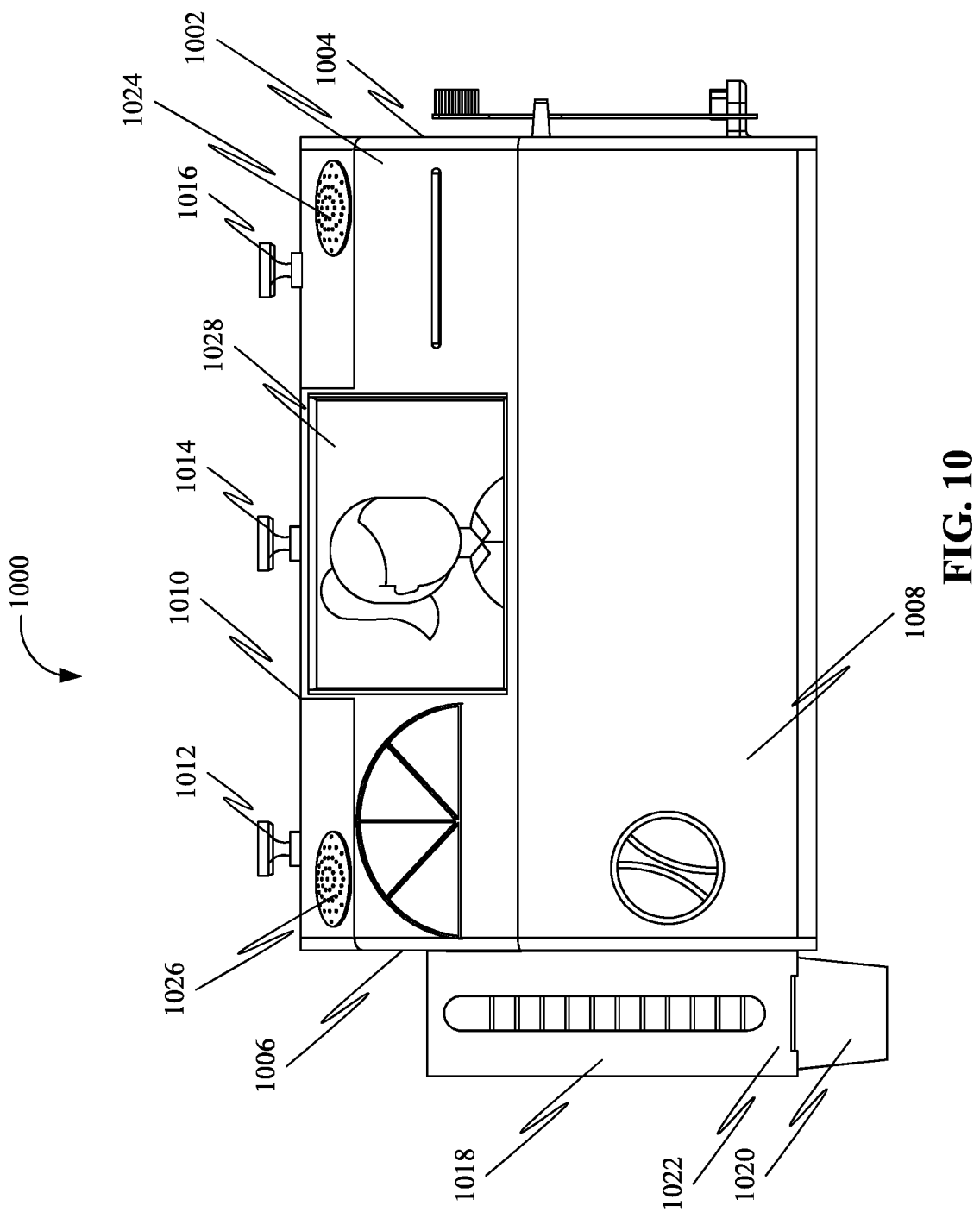
FIG. 10 is a front view of a smart dispenser for facilitating dispensing of material and presenting of content, in accordance with some embodiments.

FIG. 10 is a front view of a smart dispenser 1000 for facilitating dispensing of material and presenting of content, in accordance with some embodiments. Further, the smart dispenser 1000 may include an enclosure 1002, at least one wall mount 1012-1016, at least one container, at least one dispensing mechanism, a storage device, a processing device, and a presentation device.

Further, the at least one container may include at least one interior space and at least one opening leading into the at least one interior space. Further, the at least one interior space may be configured for storing at least one material. Further, the at least one container may include a partitioned tubular structure 1018. Further, the at least one material may include at least one cup 1020. Further, the partitioned tubular structure 1018 may be configured for storing at least one cup 1020. Further, the at least one cup 1020 may be associated with at least one dimension. Further, the at least one dosage may include the at least one cup 1020 of the at least one dimension. Further, at least one portion of the at least one cup 1020 protrudes from a first end 1022 of the partitioned tubular structure 1018.

Further, the at least one dispensing mechanism operationally coupled with the at least one container. Further, the at least one dispensing mechanism may be configured for dispensing at least one dosage of the at least one material through the at least one opening based on a command. Further, the at least one dispensing mechanism may include a terminal obstruction. Further, the terminal obstruction may be configured for dispensing the at least one cup 1020 based on an application of an external force on the at least one portion of the at least one cup 1020.

Further, the storage device may be configured for retrieving dosage data associated with the at least one dosage of the at least one material.

Further, the processing device may be communicatively coupled with the at least one dispensing mechanism and the storage device. Further, the processing device may be configured for generating the command based on the dosage data.

Further, the presentation device may be communicatively coupled with the processing device. Further, the presentation device may be configured for presenting a content to a user associated with the smart dispenser 1000 based on the command. Further, the content may include an educational package associated with an application of the at least one dosage of the at least one material. Further, the education package may include a series of at least one of instructional videos, instructional animations, and instructional diagrams for facilitating the application of the at least one dosage of the at least one material. Further, the at least one of the instructional videos, the instructional animations, and the instructional diagrams may be associated with at least one object. Further, the presenting of the educational package to the user may be based on the command. Further, the presentation device may include a media playback system. Further, the media playback system may include at least one display device 1028 and a plurality of speakers 1024-1026. Further, the media playback system may be configured for playing the educational package using at least one of a plurality of visual cues and a plurality of aural cues.

Further, the enclosure 1002 may include at least one enclosure wall 1004-1008 forming an enclosure interior space. Further, the at least one container may be disposed in the enclosure interior space. Further, the at least one enclosure wall 1004-1008 may include at least one enclosure opening disposed on the at least one enclosure wall 1004-1008 leading into the enclosure interior space.

Further, the at least one wall mount 1012-1016 may be disposed on a rear enclosure wall 1010 of the at least one enclosure wall 1004-1008. Further, the at least one wall mount 1012-1016 may be configured for detachably attaching the smart dispenser 1000 to at least one surface of at least one structure. Further, the at least one wall mount 1012-1016 may include at least one hook.

Figure 11:
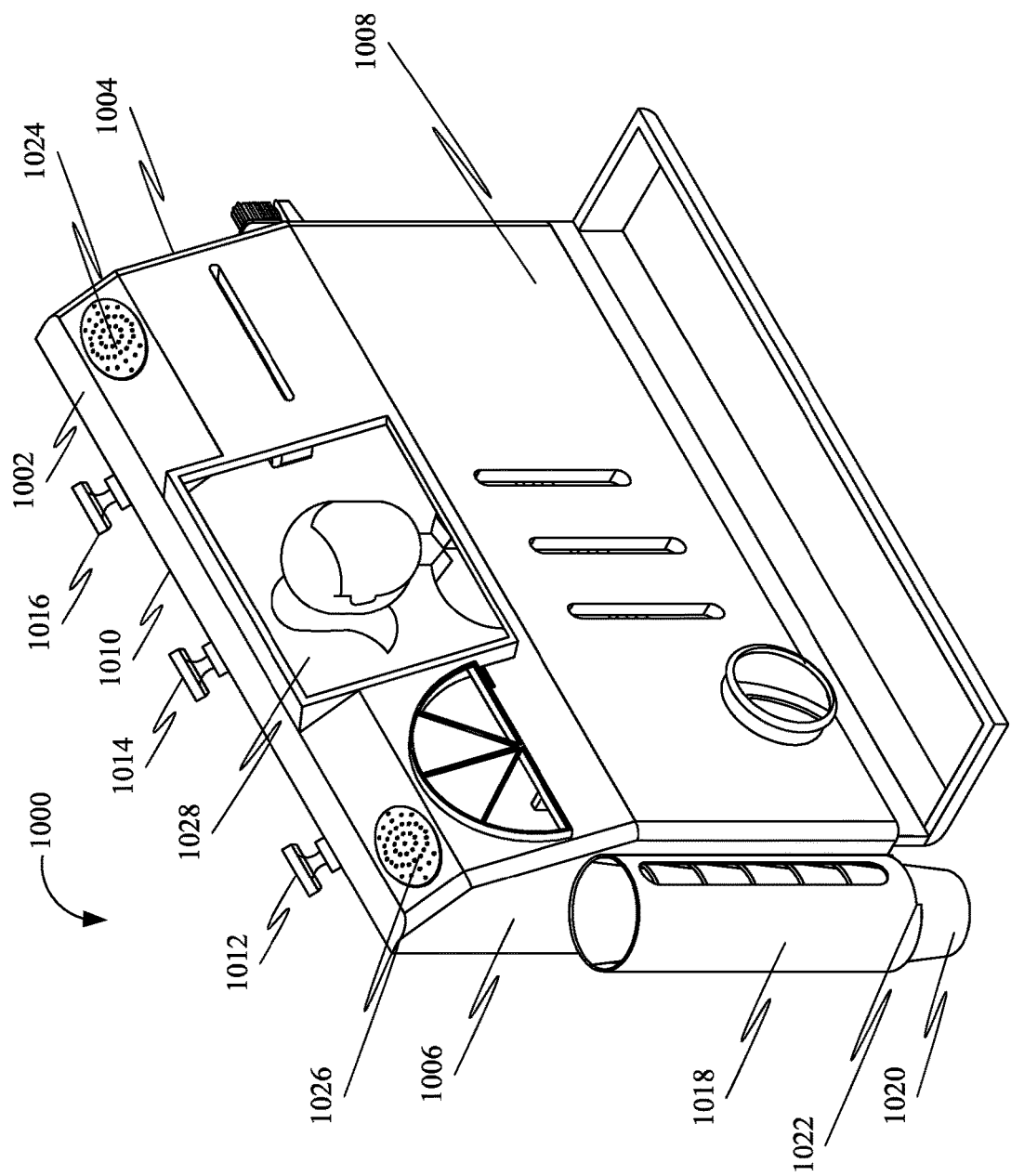
FIG. 11 is a perspective view of the smart dispenser for facilitating the dispensing of the material and the presenting of the content, in accordance with some embodiments.

FIG. 11 is a perspective view of the smart dispenser 1000 for facilitating the dispensing of the material and the presenting of the content, in accordance with some embodiments.

Figure 12:
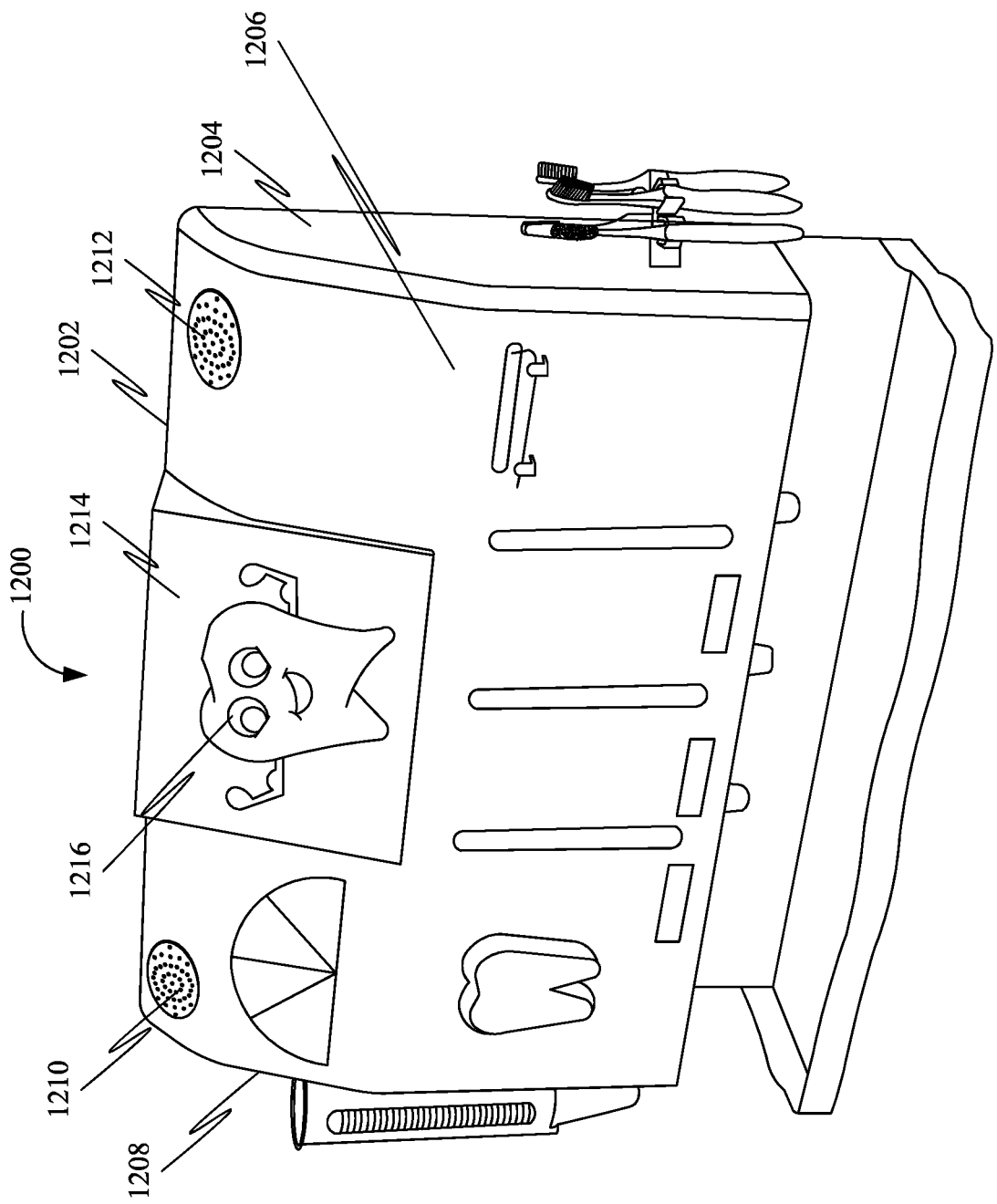
FIG. 12 is a perspective view of a smart dispenser for facilitating dispensing of material and presenting of content, in accordance with some embodiments.

FIG. 12 is a perspective view of a smart dispenser 1200 for facilitating dispensing of material and presenting of content, in accordance with some embodiments. Further, the smart dispenser 1200 may include an enclosure 1202, at least one wall mount 1404-1412, as shown in FIG. 14, at least one container, at least one dispensing mechanism 1304, as shown in FIG. 13, a storage device, a processing device, and a presentation device 1210-1214.

Figure 13:
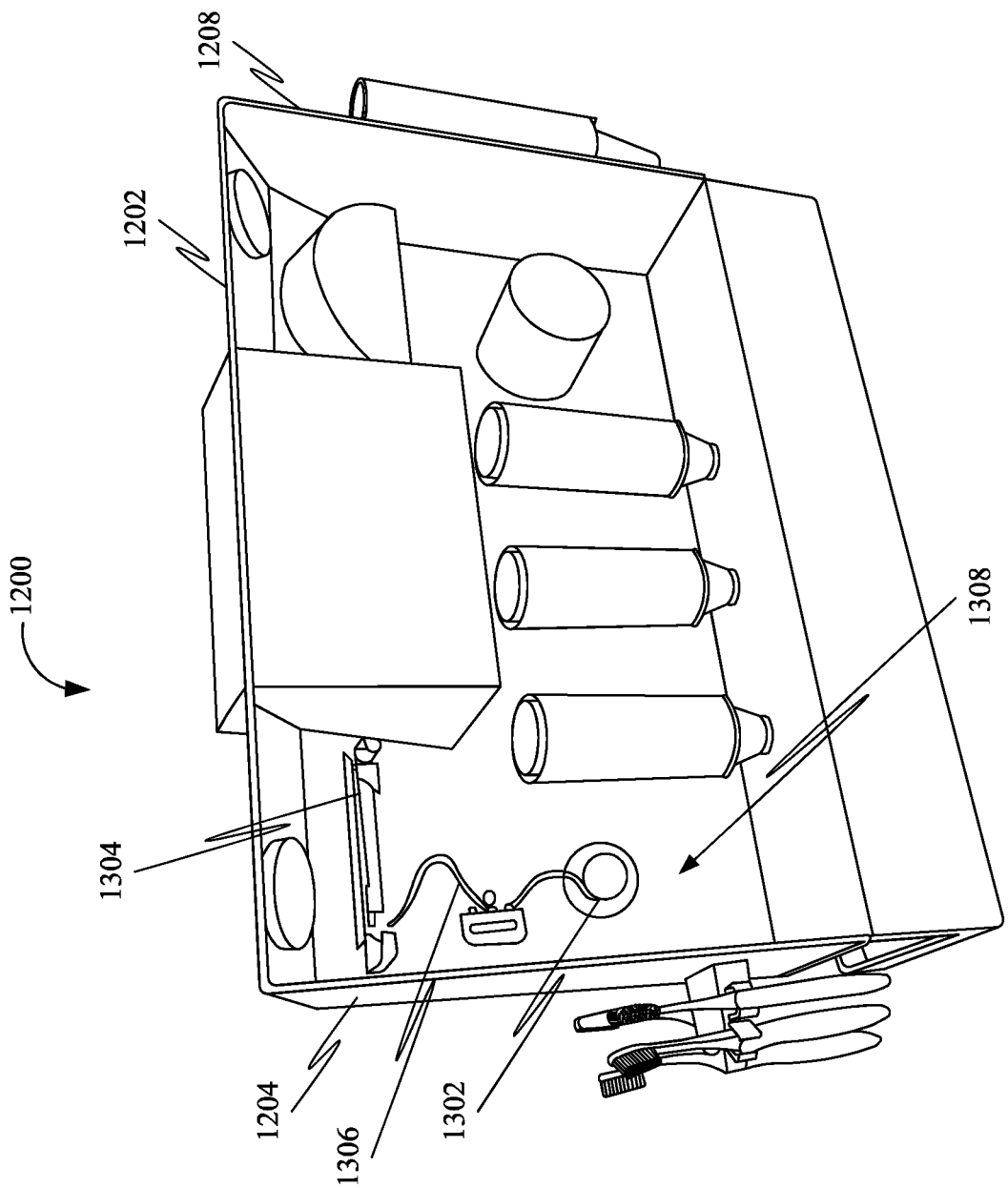
FIG. 13 is a rear perspective view of the smart dispenser without the rear enclosure wall, in accordance with some embodiments.
Figure 14:
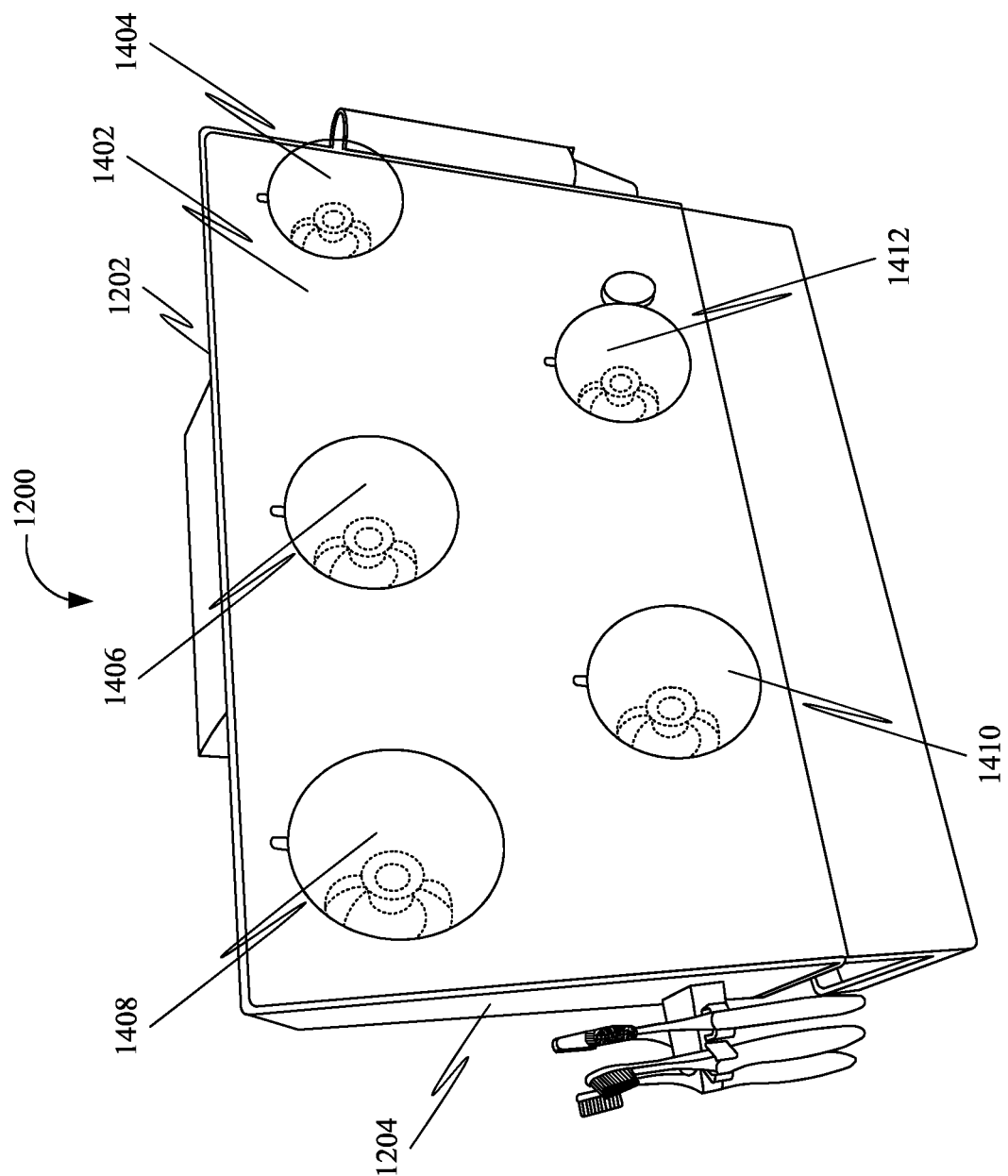
FIG. 14 is a rear perspective view of the smart dispenser with the rear enclosure wall, in accordance with some embodiments.

Further, the enclosure 1202 may include at least one enclosure wall 1204-1208 forming an enclosure interior space 1308, as shown in FIG. 13. Further, the at least one container may be disposed in the enclosure interior space 1308. Further, the at least one enclosure wall 1204-1208 may include at least one enclosure opening disposed on the at least one enclosure wall 1204-1208 leading into the enclosure interior space 1308.

Further, the at least one container may include at least one interior space and at least one opening leading into the at least one interior space. Further, the at least one interior space may be configured for storing at least one material. Further, the at least one container may include at least one spool 1302, as shown in FIG. 13. Further, the at least one material may include a dental floss 1306, as shown in FIG. 13. Further, the at least one spool 1302 may be configured for storing the dental floss 1306.

Further, the at least one dispensing mechanism 1304 operationally coupled with the at least one container. Further, the at least one dispensing mechanism 1304 may be configured for dispensing at least one dosage of the at least one material through the at least one opening based on a command. Further, the at least one dispensing mechanism 1304 may be configured for dispensing the at least one dosage of the dental floss 1306 based on the command.

Further, the storage device may be configured for retrieving dosage data associated with the at least one dosage of the at least one material.

Further, the processing device may be communicatively coupled with the at least one dispensing mechanism 1304 and the storage device. Further, the processing device may be configured for generating the command based on the dosage data.

Further, the presentation device 1210-1214 may be communicatively coupled with the processing device. Further, the presentation device 1210-1214 may be configured for presenting a content to a user associated with the smart dispenser 1200 based on the command. Further, the content may include an educational package associated with an application of the at least one dosage of the at least one material. Further, the education package may include a series of at least one of instructional videos, instructional animations, and instructional diagrams for facilitating the application of the at least one dosage of the at least one material. Further, the at least one of the instructional videos, the instructional animations, and the instructional diagrams may be associated with at least one object 1216. Further, the at least one object 1216 may include at least one character. Further, the presenting of the educational package to the user may be based on the command.

Further, the at least one wall mount 1404-1412 may be disposed on a rear enclosure wall 1402, as shown in FIG. 14, of the at least one enclosure wall 1204-1208. Further, the at least one wall mount 1404-1412 may be configured for detachably attaching the smart dispenser 1200 to at least one surface of at least one structure.

FIG. 13 is a rear perspective view of the smart dispenser 1200 without the rear enclosure wall 1402, in accordance with some embodiments.

FIG. 14 is a rear perspective view of the smart dispenser 1200 with the rear enclosure wall 1402, in accordance with some embodiments.

Figure 15:
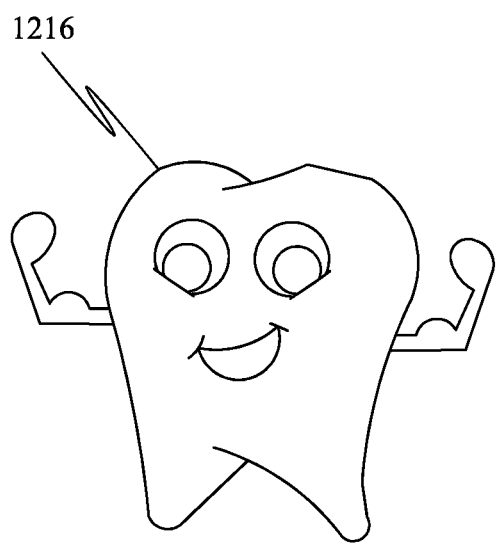
FIG. 15 is an illustration of the at least one object, in accordance with some embodiments.

FIG. 15 is an illustration of the at least one object 1216, in accordance with some embodiments.

Figure 16:
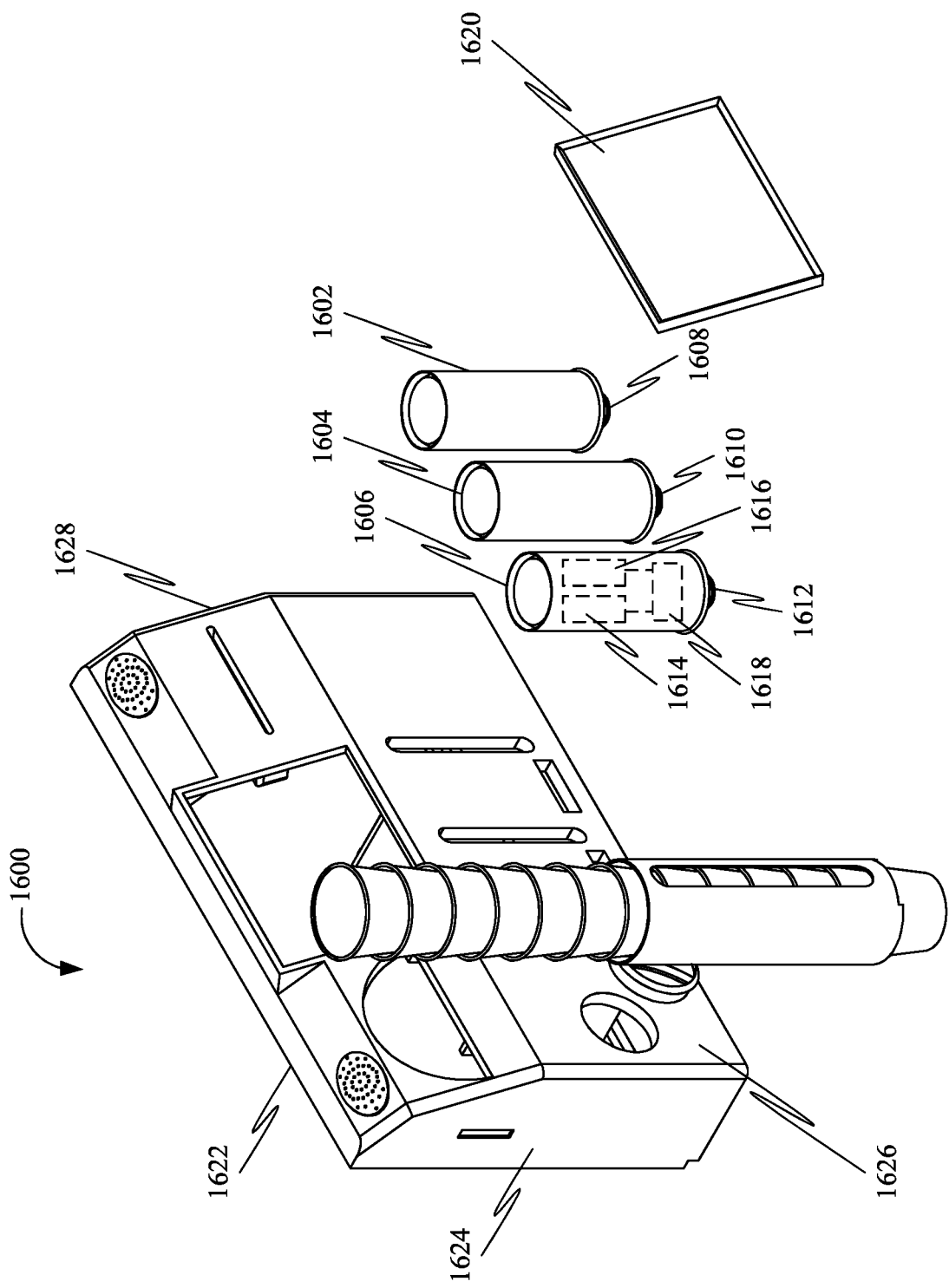
FIG. 16 is a disassembled view of a smart dispenser for facilitating dispensing of material and presenting of content, in accordance with some embodiments.

FIG. 16 is a disassembled view of a smart dispenser 1600 for facilitating dispensing of material and presenting of content, in accordance with some embodiments. Further, the smart dispenser 1600 may include an enclosure 1622, at least one container 1602-1606, at least one dispensing mechanism 1614, a storage device 1616, a processing device 1618, and a presentation device 1620.

Further, the at least one container 1602-1606 may include at least one interior space and at least one opening 1608-

1612 leading into the at least one interior space. Further, the at least one interior space may be configured for storing at least one material.

Further, the at least one dispensing mechanism 1614 operationally coupled with the at least one container 1602-1606. Further, the at least one dispensing mechanism 1614 may be configured for dispensing at least one dosage of the at least one material through the at least one opening 1608-1612 based on a command.

Further, the storage device 1616 may be configured for retrieving dosage data associated with the at least one dosage of the at least one material.

Further, the processing device 1618 may be communicatively coupled with the at least one dispensing mechanism 1614 and the storage device 1616. Further, the processing device 1618 may be configured for generating the command based on the dosage data.

Further, the presentation device 1620 may be communicatively coupled with the processing device 1618. Further, the presentation device 1620 may be configured for presenting a content to a user associated with the smart dispenser 1600 based on the command.

Further, the enclosure 1622 may be coupled with the at least one container 1602-1606. Further, the enclosure 1622 may include at least one enclosure wall 1624-1628 forming an enclosure interior space. Further, the at least one container 1602-1606 may be disposed in the enclosure interior space. Further, the at least one enclosure wall 1624-1628 may include at least one enclosure opening disposed on the at least one enclosure wall 1624-1628 leading into the enclosure interior space. Further, at least one part of the at least one container 1602-1606 protrudes from the at least one enclosure opening. Further, the at least one part may include the at least one opening 1608-1612 for facilitating the dispensing.

Further, in some embodiments, the content may include an educational package associated with an application of the at least one dosage of the at least one material. Further, the education package may include a series of at least one of instructional videos, instructional animations, and instructional diagrams for facilitating the application of the at least one dosage of the at least one material. Further, the at least one of the instructional videos, the instructional animations, and the instructional diagrams may be associated with at least one object. Further, the presenting of the educational package to the user may be based on the command.

In further embodiments, at least one wall mount may be disposed on a rear enclosure wall of the at least one enclosure wall 1624-1628. Further, the at least one wall mount may be configured for detachably attaching the smart dispenser 1600 to at least one surface of at least one structure.

In further embodiments, at least one external retainer may be disposed on the at least one enclosure wall 1624-1628. Further, the at least one external retainer may be configured for supporting at least one accouterment. Further, the at least one accouterment facilitates an application of the at least one dosage of the at least one material. Further, the at least one accouterment may include at least one toothbrush.

Figure 17:
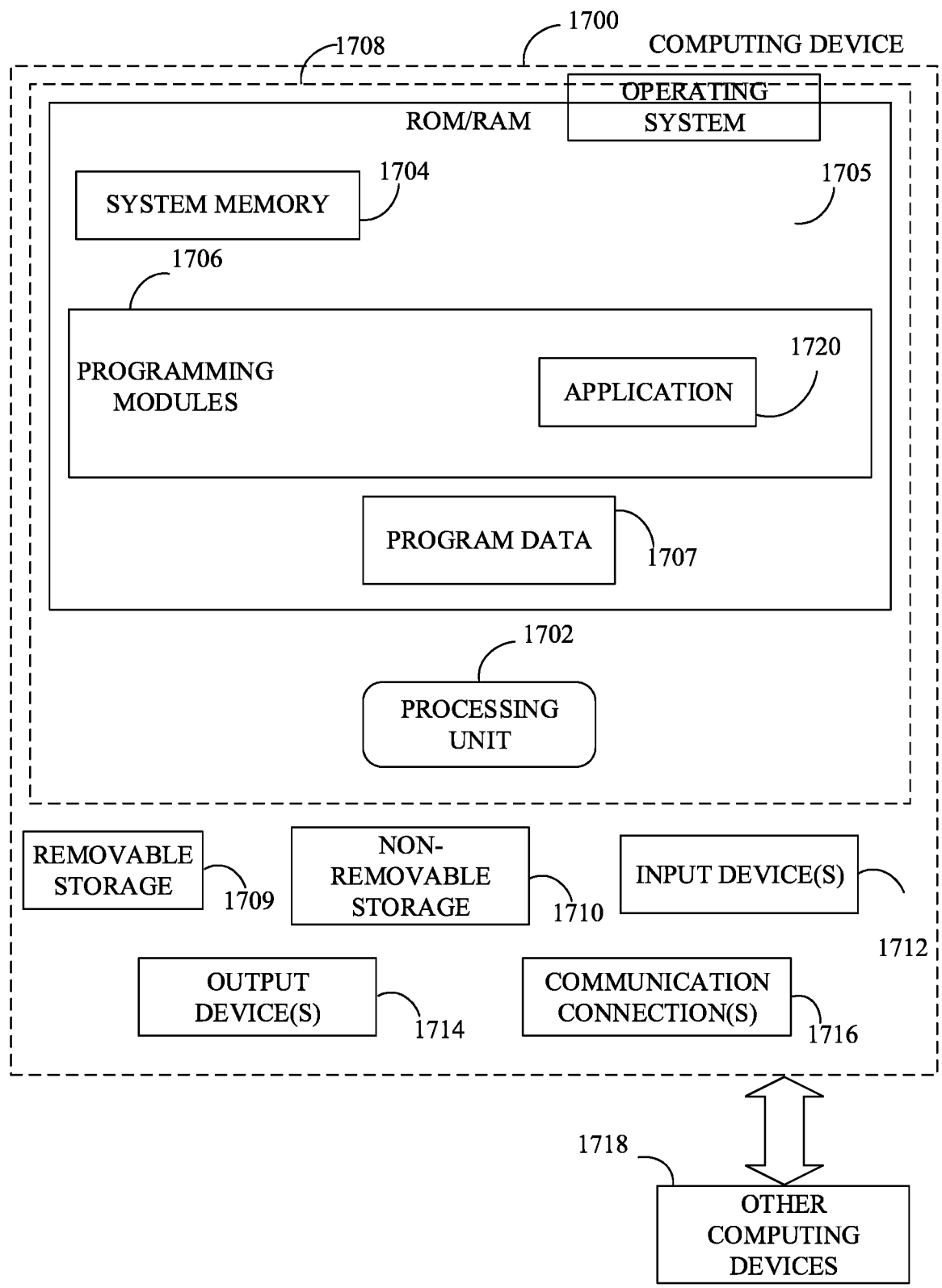
FIG. 17 is a block diagram of a computing device for implementing the methods disclosed herein, in accordance with some embodiments.

With reference to FIG. 17, a system consistent with an embodiment of the disclosure may include a computing device or cloud service, such as computing device 1700. In a basic configuration, computing device 1700 may include at least one processing unit 1702 and a system memory 1704. Depending on the configuration and type of computing device, system memory 1704 may comprise, but is not limited to, volatile (e.g. random-access memory (RAM)), non-volatile (e.g. read-only memory (ROM)), flash memory, or any combination. System memory 1704 may include operating system 1705, one or more programming modules 1706, and may include a program data 1707. Operating system 1705, for example, may be suitable for controlling computing device 1700's operation. In one embodiment, programming modules 1706 may include image-processing module, machine learning module. Furthermore, embodiments of the disclosure may be practiced in conjunction with a graphics library, other operating systems, or any other application program and is not limited to any particular application or system. This basic configuration is illustrated in FIG. 17 by those components within a dashed line 1708.

Computing device 1700 may have additional features or functionality. For example, computing device 1700 may also include additional data storage devices (removable and/or non-removable) such as, for example, magnetic disks, optical disks, or tape. Such additional storage is illustrated in FIG. 17 by a removable storage 1709 and a non-removable storage 1710. Computer storage media may include volatile and non-volatile, removable and non-removable media implemented in any method or technology for storage of information, such as computer-readable instructions, data structures, program modules, or other data. System memory 1704, removable storage 1709, and non-removable storage 1710 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 1700. Any such computer storage media may be part of device 1700. Computing device 1700 may also have input device(s) 1712 such as a keyboard, a mouse, a pen, a sound input device, a touch input device, a location sensor, a camera, a biometric sensor, etc. Output device(s) 1714 such as a display, speakers, a printer, etc. may also be included. The aforementioned devices are examples and others may be used.

Computing device 1700 may also contain a communication connection 1716 that may allow device 1700 to communicate with other computing devices 1718, such as over a network in a distributed computing environment, for example, an intranet or the Internet. Communication connection 1716 is one example of communication media. Communication media may typically be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer-readable media as used herein may include both storage media and communication media.

As stated above, a number of program modules and data files may be stored in system memory 1704, including operating system 1705. While executing on processing unit 1702, programming modules 1706 (e.g., application 1720 such as a media player) may perform processes including, for example, one or more stages of methods, algorithms, systems, applications, servers, databases as described above. The aforementioned process is an example, and processing unit 1702 may perform other processes. Other programming modules that may be used in accordance with embodiments of the present disclosure may include machine learning applications.

Generally, consistent with embodiments of the disclosure, program modules may include routines, programs, components, data structures, and other types of structures that may perform particular tasks or that may implement particular abstract data types. Moreover, embodiments of the disclosure may be practiced with other computer system configurations, including hand-held devices, general-purpose graphics processor-based systems, multiprocessor systems, microprocessor-based or programmable consumer electronics, application-specific integrated circuit-based electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the disclosure, for example, may be implemented as a computer process (method), a computing system, or as an article of manufacture, such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, solid-state storage (e.g., USB drive), or a CD-ROM, a carrier wave from the Internet, or other forms of RAM or ROM. Further, the disclosed methods' stages may be modified in any manner, including by reordering stages and/or inserting or deleting stages, without departing from the disclosure.

Figure 18:
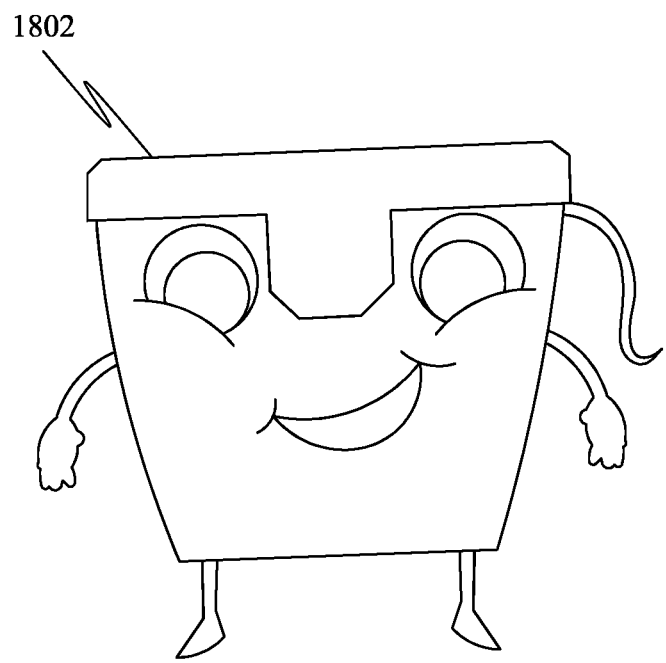
FIG. 18 is an illustration of at least one object, in accordance with some embodiments.

FIG. 18 is an illustration of at least one object 1802, in accordance with some embodiments.

Figure 19:
FIG. 19 is an illustration of at least one object, in accordance with some embodiments.

FIG. 19 is an illustration of at least one object 1902, in accordance with some embodiments.

Figure 20:
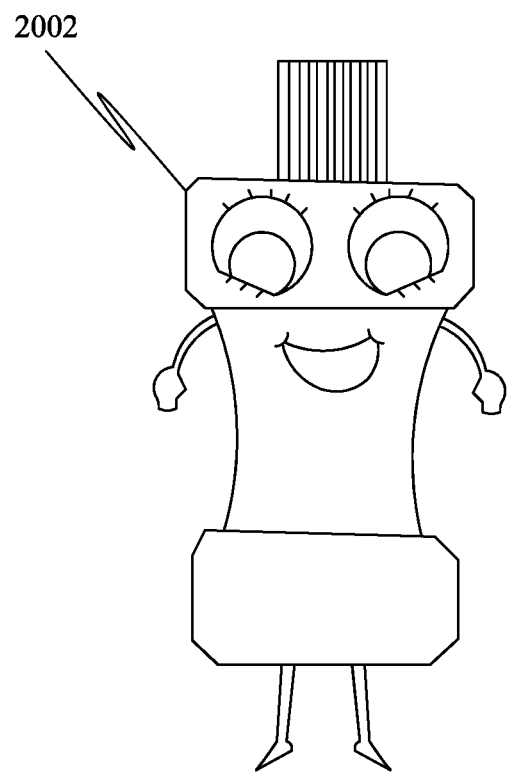
FIG. 20 is an illustration of at least one object, in accordance with some embodiments.

FIG. 20 is an illustration of at least one object 2002, in accordance with some embodiments.

Figure 21:
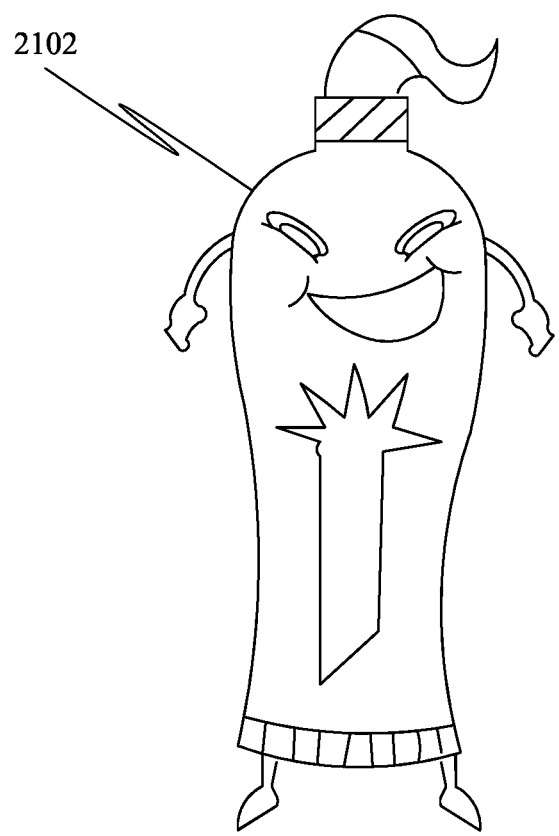
FIG. 21 is an illustration of at least one object, in accordance with some embodiments.

FIG. 21 is an illustration of at least one object 2102, in accordance with some embodiments.

Although the present disclosure has been explained in relation to its preferred embodiment, it is to be understood that many other possible modifications and variations can be made without departing from the spirit and scope of the disclosure.

The following is claimed:

1. A smart dispenser for facilitating dispensing of material and presenting of content, the smart dispenser comprising:
   at least one container comprising at least one interior space and at least one opening leading into the at least one interior space, wherein the at least one interior space is configured for storing at least one material;
   at least one dispensing mechanism operationally coupled with the at least one container, wherein the at least one dispensing mechanism is configured for dispensing at least one dosage of the at least one material through the at least one opening based on a command, wherein the at least one dispensing mechanism comprising a constricting band, a linear piston and an air compressor;
   a storage device configured for retrieving dosage data associated with the at least one dosage of the at least one material;
   a processor communicatively coupled with the at least one dispensing mechanism and the storage device, wherein the processor is configured for generating the command based on the dosage data;
   a presentation device communicatively coupled with the processor, wherein the presentation device is configured for presenting a content to a user associated with the smart dispenser based on the command, wherein the presentation device being a smartphone, a tablet, a display device, a speaker, or a projector;

wherein the content comprises an educational package associated with an application of the at least one dosage of the at least one material, wherein the education package comprises a series of at least one of instructional videos, instructional animations, and instructional diagrams for facilitating the application of the at least one dosage of the at least one material, wherein the at least one of the instructional videos, the instructional animations, and the instructional diagrams is associated with at least one object, wherein the presenting of the educational package to the user is based on the command;

an enclosure coupled with the at least one container, wherein the enclosure comprises at least one enclosure wall forming an enclosure interior space, wherein the at least one container is disposed in the enclosure interior space, wherein the at least one enclosure wall comprises at least one enclosure opening disposed on the at least one enclosure wall leading into the enclosure interior space, wherein at least one part of the at least one container protrudes from the at least one enclosure opening, wherein the at least one part comprises the at least one opening for facilitating the dispensing;

at least one wall mount disposed on a rear enclosure wall of the at least one enclosure wall, wherein the at least one wall mount is configured for detachably attaching the smart dispenser to at least one surface of at least one structure, wherein the at least one wall mount comprises at least one suction cup;

at least one external retainer disposed on the at least one enclosure wall, wherein the at least one external retainer is configured for supporting at least one accouterment, wherein the at least one accouterment facilitates the application of the at least one dosage of the at least one material;

a recharging station configured for supplying electrical power to at least one tooth brush associated with the smart dispenser, wherein the at least one tooth brush facilitates an application of the at least one dosage of the at least one material, wherein the recharging station comprises a platform, a connector, a distributor, and at least one power source, wherein the platform protrudes laterally from the at least one enclosure wall, wherein the platform is configured for receiving the at least one tooth brush, wherein the at least one tooth brush is electrically coupled with the distributor using the connector, wherein the distributor is configured for receiving the electrical power from the at least one power source, wherein the electrical power is associated with at least one of a quantity and a quality, wherein the distributor is configured for transforming the electrical power from at least one of a first quantity and a first quality to at least one of a second quantity and a second quality, wherein the distributor is configured for supplying the electrical power of the at least one of the second quantity and the second quality to the at least one tooth brush through the connector;

at least one tray coupled with the enclosure, wherein the at least one tray is detachably attached to a base end of the enclosure, wherein the at least one tray extends laterally in relation to the at least one enclosure wall, wherein the at least one tray is configured for holding at least one first container juxtaposed the at least one enclosure opening, wherein the holding of the at least one first container facilitates receiving of the at least one material in the at least one first container based on the dispensing.

2. The smart dispenser of claim 1 further comprising at least one sensor coupled with the at least one container, wherein the at least one sensor is configured for generating sensor data based on a physical quantity of the at least one material disposed in the at least one interior space, wherein the processor is communicatively coupled with the at least one sensor, wherein the processor is configured for:
analyzing the sensor data; and
generating at least one notification based on the analyzing, wherein the presentation device is configured for presenting the at least one notification to the user.

3. The smart dispenser of claim 1, wherein the presentation device comprises a media playback system, wherein the media playback system comprises at least one display device and a plurality of speakers, wherein the media playback system is configured for playing the educational package using at least one of a plurality of visual cues and a plurality of aural cues.

4. The smart dispenser of claim 1 further comprising at least one nozzle fluidly coupled with the at least one container using at least one valve, wherein the at least one nozzle comprises a hollow tapered structure, wherein a first end of the at least one nozzle is coupled with the at least one opening, wherein the at least one material comprises at least one fluid, wherein the at least one container is configured storing the at least one fluid, wherein the at least one dispensing mechanism is configured for dispensing the at least one dosage of the at least one fluid through a second end of the at least one nozzle using the at least one valve based on the command.

5. The smart dispenser of claim 1, wherein the at least one container comprises at least one spool, wherein the at least one material comprises a dental floss, wherein the at least one spool is configured for storing the dental floss, wherein the at least one dispensing mechanism is configured for dispensing the at least one dosage of the dental floss based on the command.

6. The smart dispenser of claim 5 further comprises at least one first sensor coupled with the at least one spool, wherein the dental floss is drawable from the at least one spool based on an application of an external force on an end of the dental floss, wherein the at least one first sensor is configured for generating first sensor data based on a physical quantity of the dental floss, wherein the processor is communicatively coupled with the at least one first sensor, wherein the processor is further configured for analyzing the first sensor data based on the dosage data, wherein the generating of the command is based on the analyzing, wherein the at least one dispensing mechanism comprises at least one cutter, wherein the at least one dosage comprises at least one segment of the dental floss, wherein the at least one cutter is configured for severing the at least one segment based on the command, wherein the severing facilitates dispensing of the at least one segment of the dental floss.

7. The smart dispenser of claim 1, wherein the at least one container comprises a partitioned tubular structure, wherein the at least one material comprises at least one cup, wherein the partitioned tubular structure is configured for storing at least one cup, wherein the at least one cup is associated with at least one dimension, wherein the at least one dosage comprises the at least one cup of the at least one dimension, wherein at least one portion of the at least one cup protrudes from a first end of the partitioned tubular structure, wherein the at least one dispensing mechanism comprises a terminal obstruction, wherein the terminal obstruction is configured for dispensing the at least one cup based on an application of an external force on the at least one portion of the at least one cup.

8. The smart dispenser of claim 1 further comprising at least one input device disposed on the at least one enclosure wall, wherein the at least one input device is configured for:
   receiving at least one input from the user associated with the smart dispenser; and
   generating input data based on the receiving, wherein the processor is communicatively coupled with the at least one input device, wherein the processor is configured for:
   analyzing the input data; and
   generating the dosage data based on the analyzing of the input data, wherein the storage device is configured for storing the dosage data based on the generating.

9. The smart dispenser of claim 1 further comprising a communication device communicatively coupled with the presentation device, wherein the communication device is configured for receiving the content from at least one external device over at least one of a wired connection and a wireless connection, wherein the presenting of the content is based on the receiving of the content.

10. The smart dispenser of claim 1, wherein the at least one container comprises at least one first material, wherein the at least one first material comprises at least one of biodegradable material and recyclable material.

* * * * *